United States Patent [19]

Haub et al.

[11] 4,216,618

[45] Aug. 12, 1980

[54] METHOD AND APPARATUS FOR INCREASING THE SPACING BETWEEN PLANTS IN ACCORDANCE WITH THEIR GROWTH RATE

[75] Inventors: John T. Haub, Maple Grove; James G. Krassas, Plymouth; Stanley C. Rustad, Golden Valley; Noel Davis, Wayzata, all of Minn.

[73] Assignee: General Mills, Inc., Minneapolis, Minn.

[21] Appl. No.: 930,448

[22] Filed: Aug. 2, 1978

[51] Int. Cl.² .................................... A01G 31/02
[52] U.S. Cl. ........................... 47/65; 47/17; 47/39
[58] Field of Search ................. 47/59–65, 47/17, 39

[56] References Cited

U.S. PATENT DOCUMENTS

| | | | |
|---|---|---|---|
| 4,028,847 | 6/1977 | Davis et al. | 47/65 |
| 4,035,950 | 7/1977 | Anselm | 47/59 |
| 4,166,341 | 9/1979 | Vestergaard | 47/59 |

FOREIGN PATENT DOCUMENTS 755175  8/1975  South Africa ........................ 47/65

*Primary Examiner*—Robert E. Bagwill
*Attorney, Agent, or Firm*—G. O. Enockson; L. M. Lillehaugen; S. R. Peterson

[57] ABSTRACT

A selected number of troughs containing small plants therein are placed in a parallel relation with each other at one end of a soilless growth chamber. Tubular screw sections having helical grooves therein are employed for advancing the troughs from the loading end of the chamber to the unloading end thereof, the helical or screw pitch being considerably greater at the unloading or harvesting end in order to accommodate for the increased size of the plants as they reach maturity. In other words, the pitch of the helix is correlated with the rate at which the plants mature. Tubular screw sections having different pitches can be substituted when the growth rate differs from one species to another.

61 Claims, 23 Drawing Figures

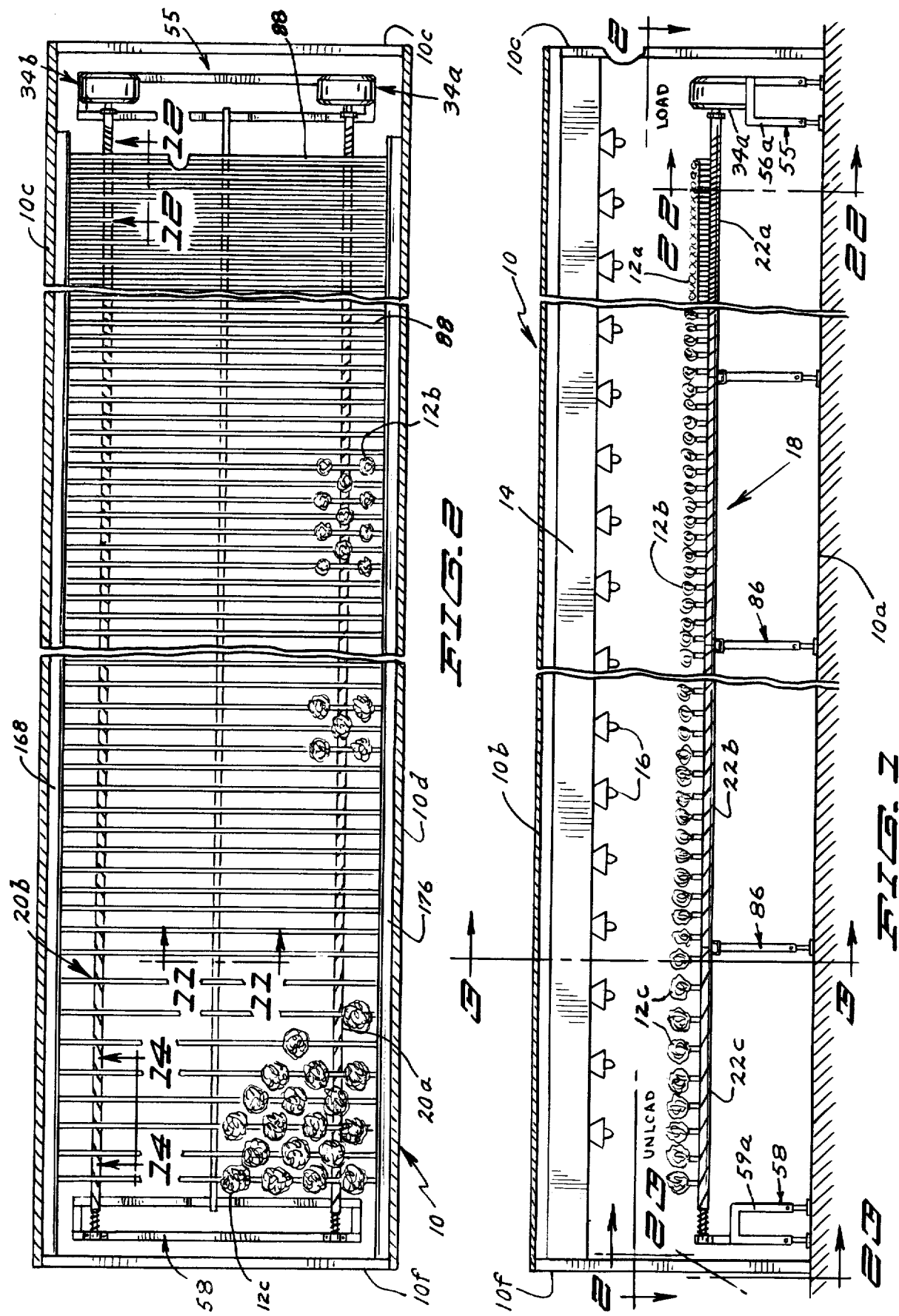

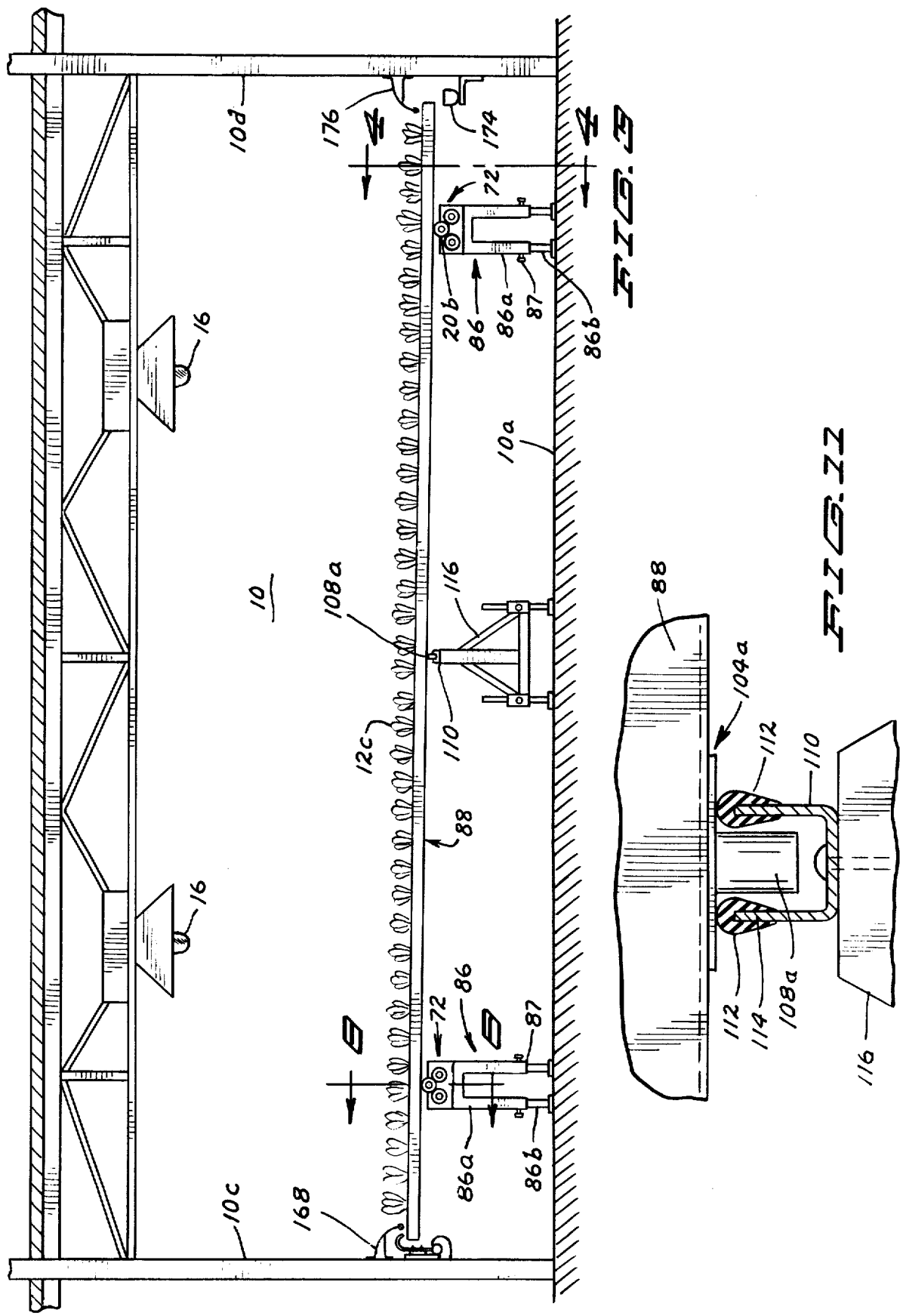

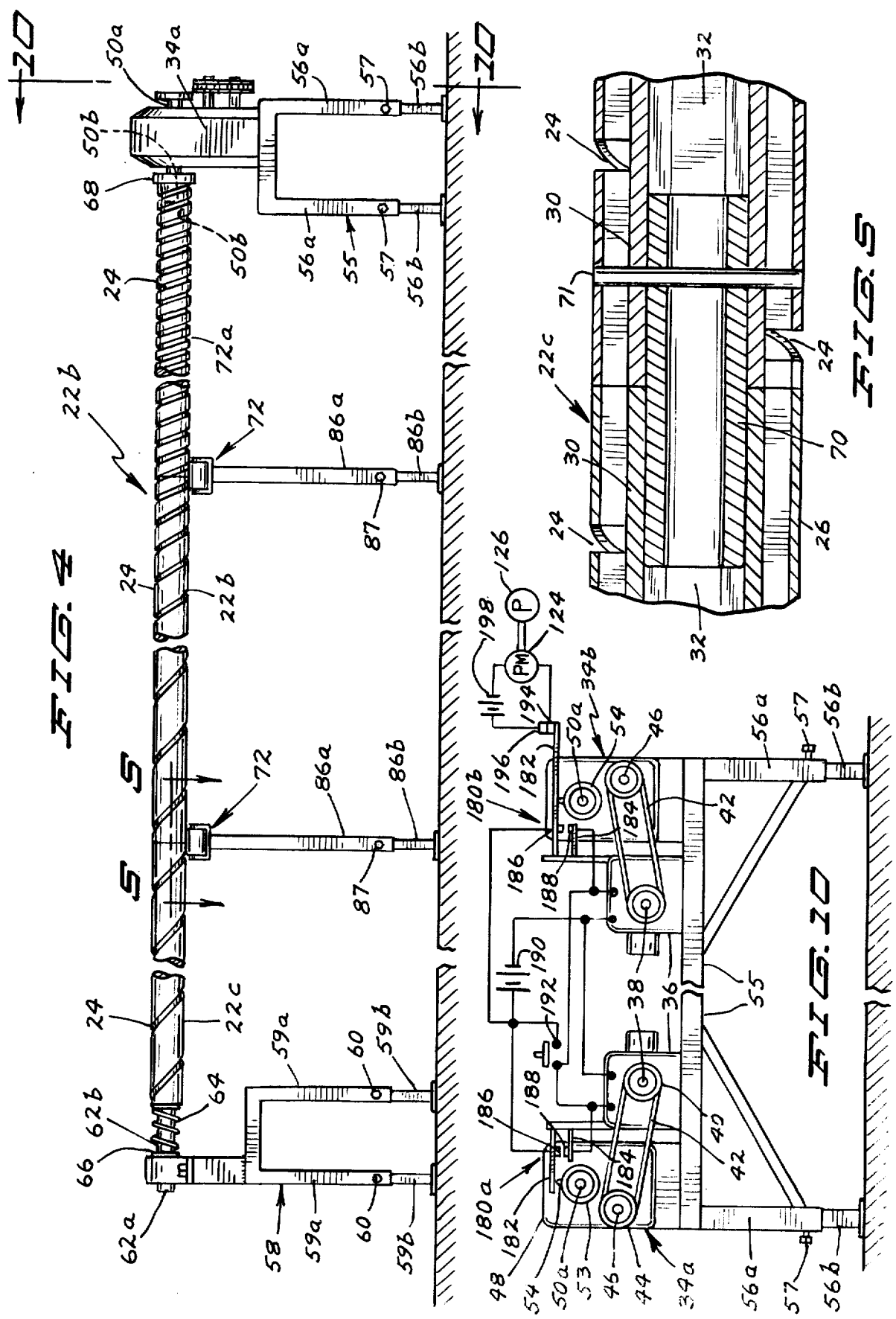

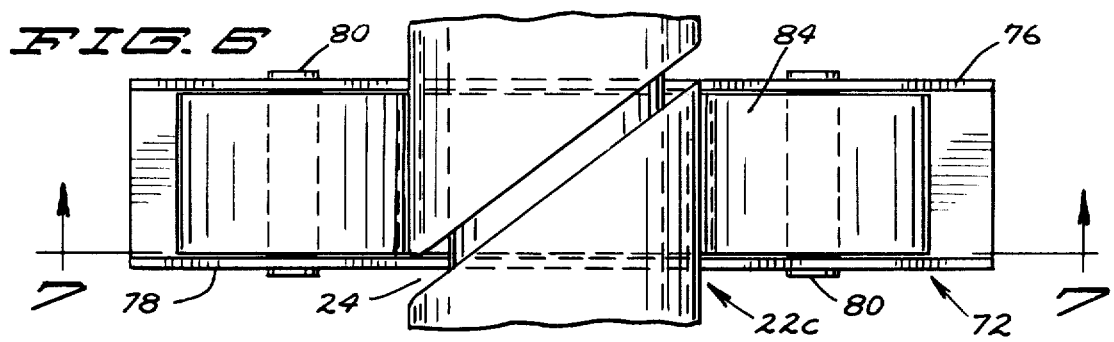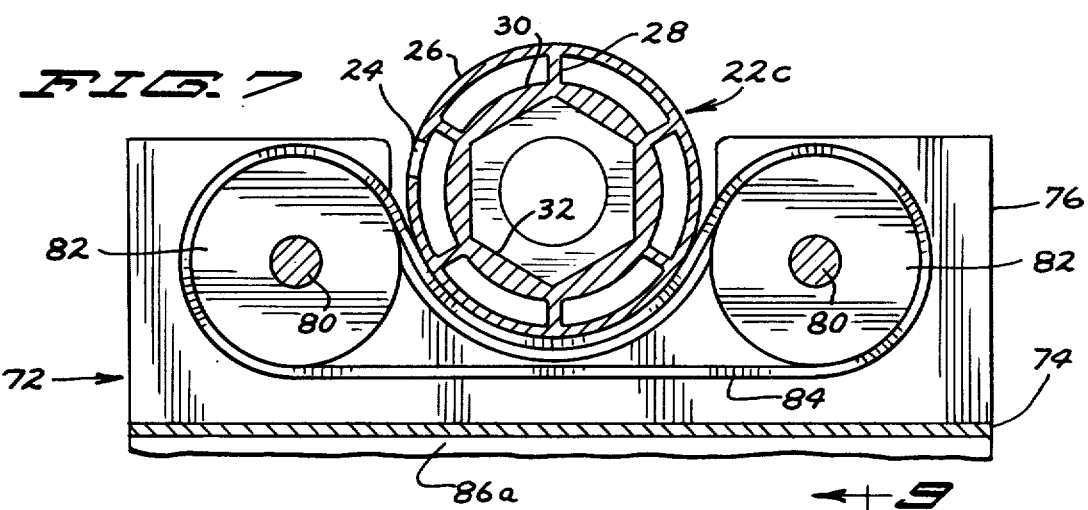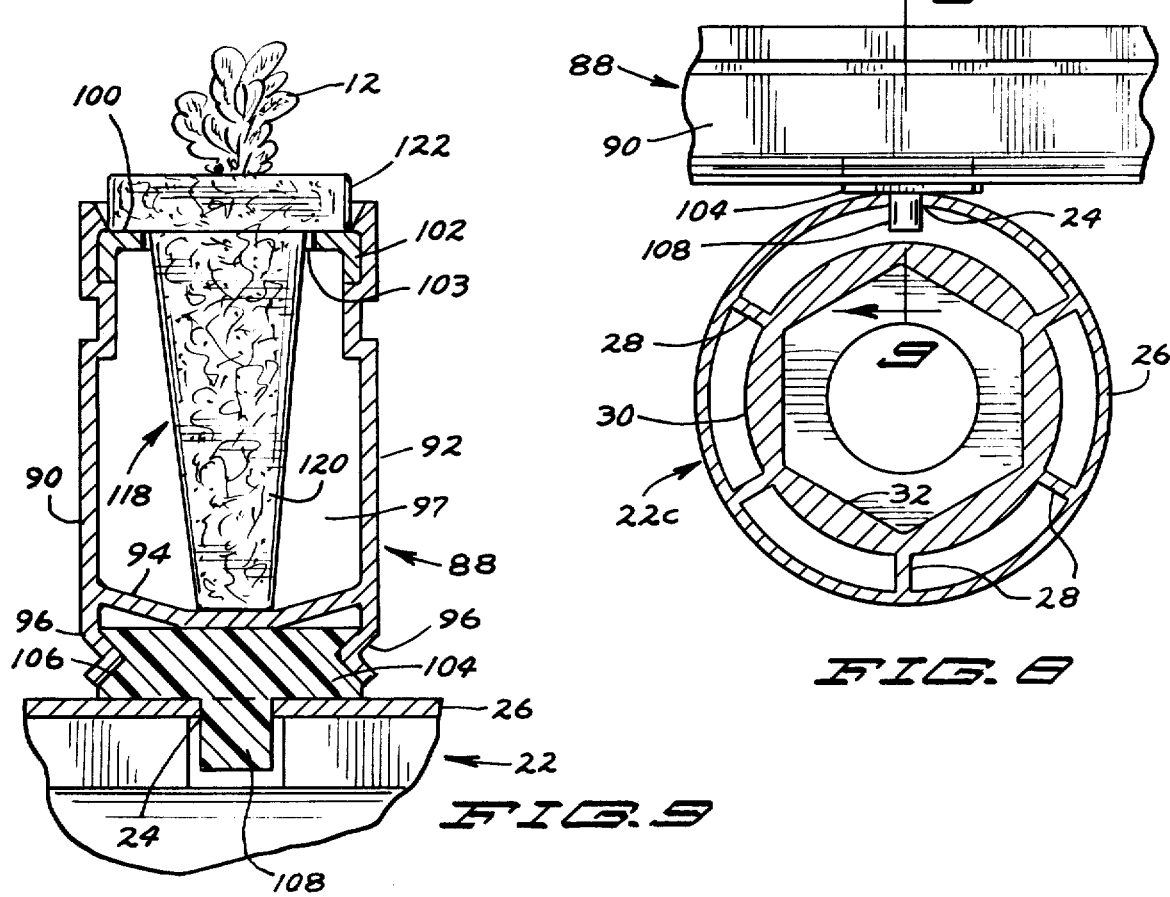

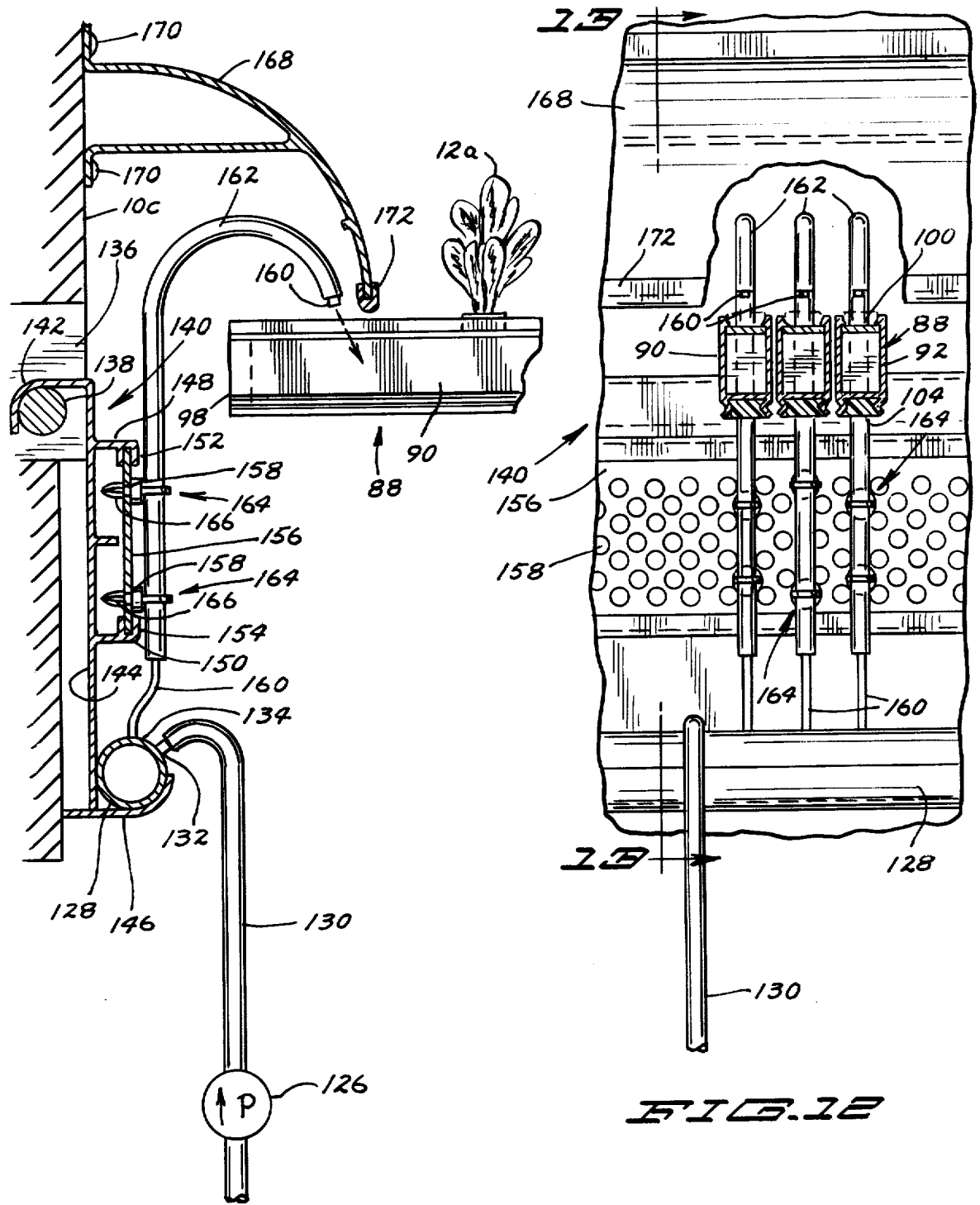

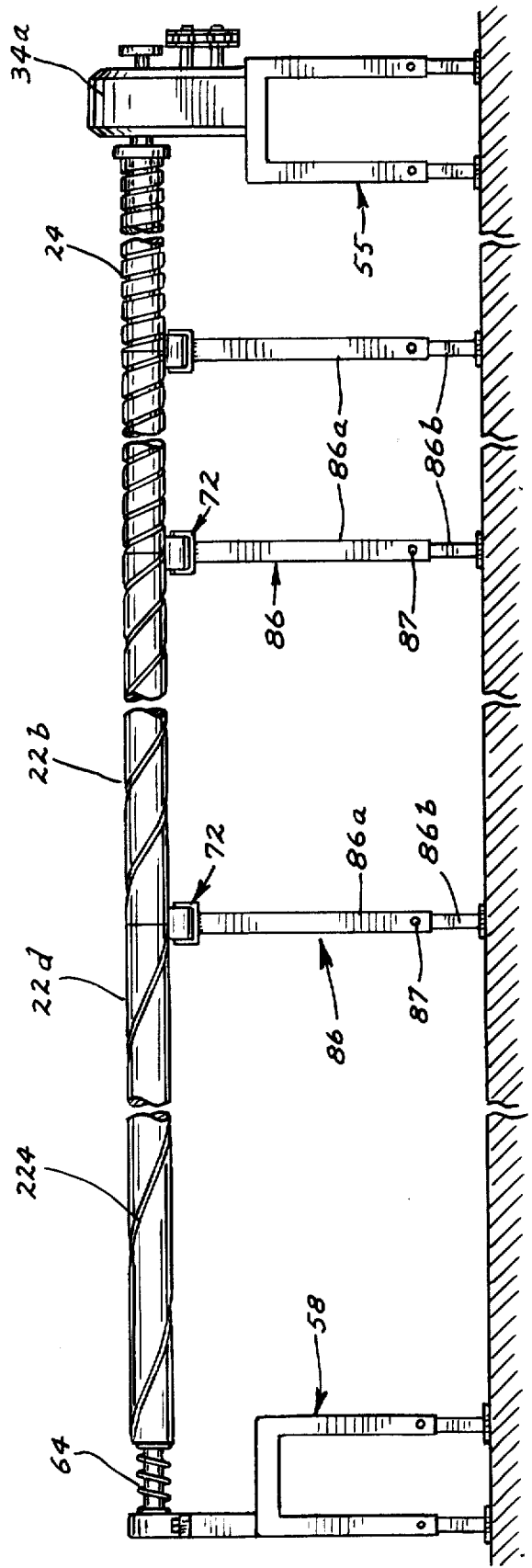

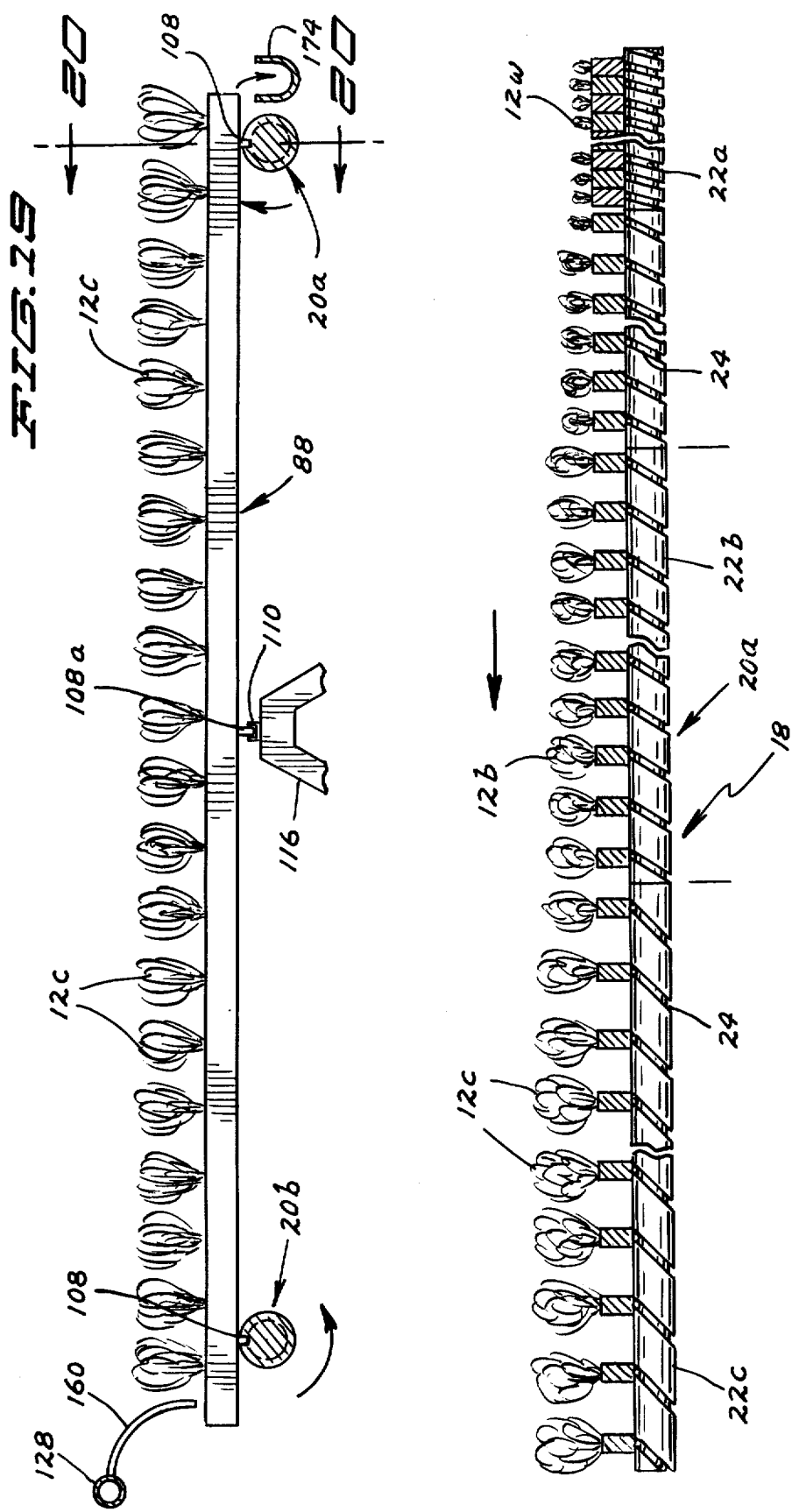

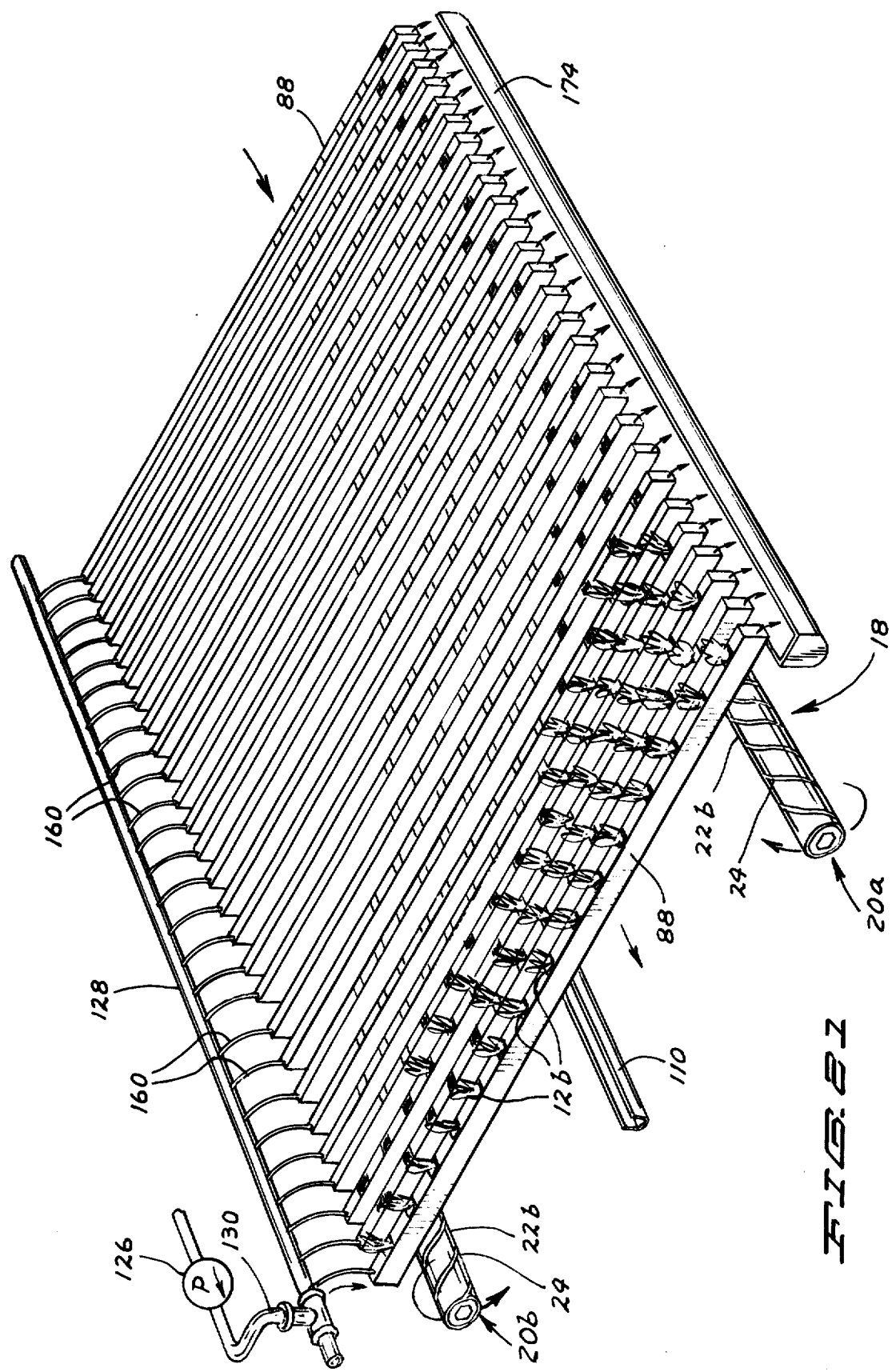

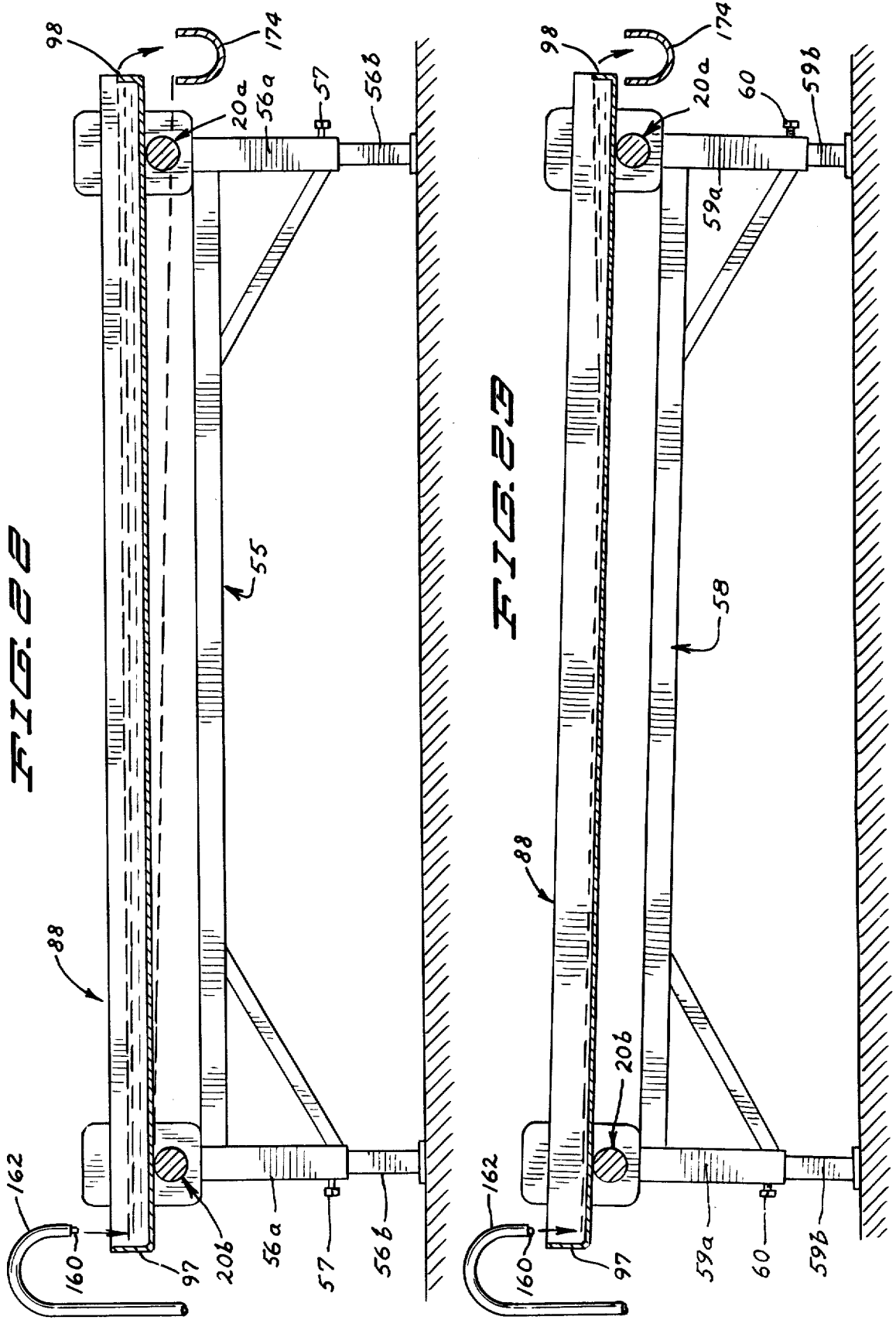

METHOD AND APPARATUS FOR INCREASING THE SPACING BETWEEN PLANTS IN ACCORDANCE WITH THEIR GROWTH RATE

BACKGROUND OF THE INVENTION

1. Field of the Invention

This invention relates generally to a method and apparatus for growing plants under artificial lights, and pertains more particularly to a method and apparatus for increasing the spacing between rows of plants contained in parallel troughs as the plants mature and become larger in a soilless growth chamber.

2. Description of the Prior Art

The hydroponic or soilless growing of plants is not new. Numerous efforts have been made, particularly by those interested in conducting only small scale growing operations for personal consumption. Owing to increased transportation costs and other factors, the mass growing of plants under controlled hydroponic conditions has proved to be commercially feasible. One such system is described and claimed in U.S. Pat. No. 4,028,847, granted on June 14, 1977 to Davis et al, and titled "Apparatus for Producing Plants." While this apparatus has considerable merit, it does not possess as much versatility as is sometimes desired. Also, the trays do not lend themselves readily to efficient cleaning. A highly advantageous feature of the patent is the spacing of plants farther apart as they mature or grow. In a sense, the present method and apparatus, as far as the spacing feature is concerned, can be deemed to be an improvement over the apparatus described in the aforesaid patent, largely due to the simplicity of our arrangement coupled with still other advantages hereinafter enumerated.

SUMMARY OF THE INVENTION

A general object of the present inventionn is to provide a simplified and versatile method and apparatus for growing plants. More specifically, the invention envisages the increasing of the space between adjacent rows of plants as the plants grow and become larger. In this regard, a group of troughs containing the seedlings are initially arranged in a close or proximal relationship with each other and progressively separated a greater distance apart as the seedlings mature.

Also, an object of the invention is to utilize personnel more effectively, for the present invention permits considerable freedom of scheduling people. In this regard, by stopping or starting groups or batches of troughs, one entire batch or group will reach maturity at a given time and all of the troughs in this particular group can be removed or harvested at that time.

Associated with the foregoing object is a secondary object resulting from the collective removal of a group of troughs at one time. It can be appreciated that the troughs during a complete growing cycle of fourteen days or so, the time depending specifically on the type of crop or plant, will accumulate various residual material from the liquid nutrient that is being circulated. Thus, instead of cleaning one trough at a time, the present invention enables a whole group of troughs to be cleaned prior to using them again without disturbing the continuity of the growing process.

Another object is to provide a free trough expansion system in which the liquid nutrient is supplied and drained from each trough without resort to interconnecting plumbing which would interfere with the advancement or movement of the troughs through the growth chamber. An aim of the invention is to permit either an intermittent or continuous feed of nutrient to be employed, either of which avoids the use of interfering plumbing, as generally alluded to immediately above.

Still another object of the invention is to make a more efficient use of the liquid nutrient. An aim of the invention is to deliver the liquid nutrient at one end of slightly inclined troughs, any surplus being gravitationally drawn off at the other end for reuse. Also, the flow of the nutrient through each trough is through a restricted cross section closely adjacent the plant's roots and not spread over a relatively large area, as has usually been the case in the past.

Another object is to submerge or partially submerge the root area of the plants to whatever degree that will best promote plant growth. This is achieved by inclining the various troughs, the amount of inclination determining the depth of nutrient. It is within the purview of our invention to vary the inclination in relation to plant development. For instance, the plants in their early stages of development might very well require a deeper depth because their roots are not as long; the invention permits this to be realized with a lesser depth for the plants as they approach full maturity.

Yet another object of the invention is to provide a means for periodically advancing entire groups of troughs containing plants therein and having each trough properly located for receiving the nutrient at the end of the advancement. More specifically, the spacing between the various feed tubes which deliver the nutrient to the troughs is correlated with the helical pitch of the tubular screw sections at that particular stage of plant growth.

Another object is to provide for shifting or repositioning the feed tubes that deliver the liquid nutrient to the troughs so that when the tubular screw sections are replaced in order to accommodate a different rate of plant growth the delivery tubes for the nutrient can then be properly positioned for the specific indexing of the troughs that is most appropriate for the variety of plant then being cultivated.

Another object of the invention is to enable simplified night and day conditions to be simulated within a growth chamber utilizing artificial light whenever such a simulation will stimulate plant growth. In this regard, it is intended that a group of plants, more specifically rows of troughs containing such group of plants, be placed at the loading end of the growth chamber in a proximal relation with each other and intermittently advanced through the chamber, the invention permitting the stopping at selected times and periods most suitable for inducing an optimum growth of the particular plant being hydroponically cultivated. Thus, when at any given stage of development, the plants can be subjected to an amount of artificial light most beneficial for that stage while the plants are reposed. The light can be on for a selected period of time and then turned off for another selected period of time, or left on indefinitely, if continuous light is best for that stage of development or that species of plant.

A still further object of the invention is to make use of a simple and inexpensive drive mechanism for the tubular screw sections, it being contemplated that a constant speed drive mechanism be employed for each set of screw sections. More specifically, it is planned that a pushbutton switch be operated which will cause one or more revolutions of the tubular screw sections to take place, a specific number of rotations advancing all of the troughs of one group to the next growing station. It is also within the purview of the invention to either maintain a continuous flow of nutrients or to shut off the delivery of nutrient to the various troughs during the brief interval that the various groups are advanced from one station to the next.

Briefly, our invention contemplates the initial arranging of a group of troughs in a close together, parallel relationship. When the plants have grown somewhat, then that entire group of troughs is advanced to the next growing station and allowed to mature further. This advancement is continued periodically through the entire growing cycle by simply turning on a pair of driving mechanisms during brief intervals. More specifically, tubular screw sections having helical grooves or slots therein are rotated a predetermined number of revolutions, the number depending upon the number of troughs in a group, so as to advance all of the troughs in each group from one growing station to the next. This is done intermittently throughout the entire growing cycle, or the apparatus can be operated continuously during the complete growing cycle or during selected segments of the cycle, the pitch of the helical grooves increasing in order to accommodate increases in plant size.

In one embodiment of the invention, delivery tubes for supplying the liquid nutrient to one end of the troughs are spaced in accordance with the pitch of the helical grooves so that each time that the troughs are stopped for the beginning of another growing period, then each trough will be in direct alignment or registry with a delivery tube. The nutrient is only turned off during brief intervals between the growing periods, this being when the groups are advanced from one growing stage to the next. In another embodiment, the delivery tubes are also spaced in relation to the screw pitch, but overlapping inclined deflectors guide the nutrient from the delivery tubes into the various troughs. In this situation, the nutrient flows continuously. No piping connections are employed in either embodiment which would otherwise interfere with the free expansive movement of the troughs.

It is also within the contemplation of the invention to readily change tubular screw sections so as to provide a preferred or optimum pitch for a different species of plant having a different growth rate. It is also intended that the various feed tubes for the nutrient be capable of being relocated when the tubular sections are changed so that the spacing therebetween will always correspond or be correlated with the pitch of the particular tubular sections then being employed.

BRIEF DESCRIPTION OF THE DRAWINGS

FIG. 1 is a longitudinal sectional view of a typical growth chamber employing apparatus exemplifying the present invention, the illustrated apparatus intermittently advancing various groups of plants from one growing station to the next within the chamber;

FIG. 2 is a top plan view corresponding to FIG. 1;

FIG. 3 is an enlarged transverse sectional view taken in the direction of line 3—3 of FIG. 1;

FIG. 4 is a view of one set of tandemly connected tubular screw sections with a number of sections removed because of space limitations, the view being taken generally in the direction of line 4—4 of FIG. 3 but omitting the troughs;

FIG. 5 is a sectional detail in the direction of line 5—5 of FIG. 4, being further enlarged, to show the manner in which adjacent ends of two tubular screw sections are coupled together;

FIG. 6 is a top plan view of one of the special bearing assemblies for the tubular sections, the view looking downwardly in the direction of line 6—6 of FIG. 3;

FIG. 7 is a sectional view of the bearing assembly of FIG. 6, the view being taken in the direction of line 7—7 thereof;

FIG. 8 is a sectional view taken in the direction of line 8—8 of FIG. 3 for the purpose of illustrating the manner in which a tubular screw section drives or advances a fragmentarily depicted trough;

FIG. 9 is an enlarged sectional view taken in the direction of line 9—9 of FIG. 8 for the purpose of illustrating to better advantage the cross sectional make-up of a trough and to show more clearly how the trough is driven by the screw section of FIG. 8;

FIG. 10 is an end elevational view corresponding to FIGS. 1 and 2 for the purpose of presenting the two drive mechanisms with the motor circuitry added;

FIG. 11 is a sectional detail of the centrally located guiding track for the various troughs for assuring that the various troughs will be advanced rectilinearly;

FIG. 12 is a considerably enlarged elevational view of three of the feed tubes for delivering the liquid nutrient directly into three adjacent troughs, the view being taken in the direction of line 12—12 of FIG. 2 at the loading or starting end of the growth chamber;

FIG. 13 is a sectional view in the direction of line 13—13 of FIG. 12 for the purpose of picturing one of the nutrient delivery tubes and the manner in which it is releasably fastened so that it can be repositioned so as to correlate the spacing between tubes with the particular pitch of the screw sections at this particular growing stage;

FIG. 18 is a view similar to FIG. 4 but showing tubular screw sections at the left having greater pitch than the pitch appearing at the left in FIG. 4, such sections having been substituted for the correspondingly located screw sections of FIG. 4 in order to accommodate plants requiring more space when mature or approaching maturity;

FIG. 19 is a diagrammatic view corresponding generally to FIG. 3;

FIG. 20 is a sectional view taken in the direction of line 20—20 of FIG. 19, the view showing the increased growth of the plants and the increased spacing between rows of such plants resulting from the increased pitch of the helical grooves;

FIG. 21 is a diagrammatic perspective view of a group of troughs that have reached an intermediate growing stage and which have separated or spaced somewhat from each other, the view representing a spacing that corresponds generally to the central portion of FIG. 20;

FIG. 22 is a diagrammatic view taken in the direction of line 22—22 of FIG. 1 for the purpose of showing the manner in which the discharge end of one of the troughs at the loading end is raised in order to increase the depth of the nutrient, and FIG. 23 is a diagrammatic view generally similar to FIG. 22 but taken in the direction of line 23—23 in FIG. 1 for the purpose of showing how the discharge end of the pictured trough is maintained at a lower elevation in order to lessen the depth of the nutrient.

DESCRIPTION OF THE PREFERRED EMBODIMENT

Figure 14:
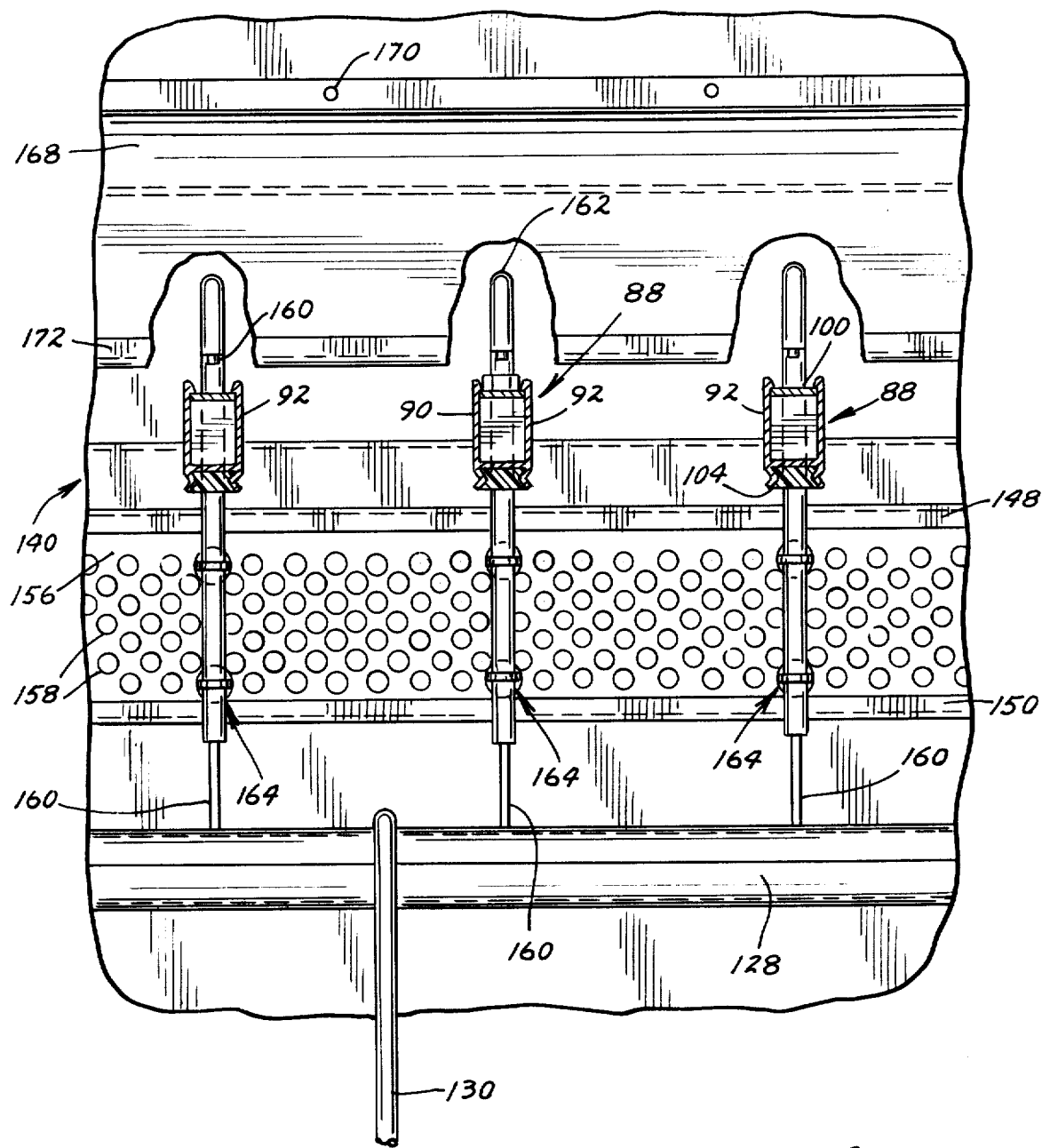
FIG. 14 is a view similar to FIG. 12 but taken in the direction of line 14—14 of FIG. 2 at the unloading or harvesting end of the growth chamber.

Although our invention can be employed in various modular forms and plural modular arrangements, only one module or growth chamber 10 need be shown in order to provide a ready understanding of our invention. It can be explained at the outset that a starter chamber would normally be resorted to in which the seeds are initially placed for the purpose of germinating, the resulting seedlings after a predetermined period, say, seven or eight days, then being placed in the module or growth chamber 10. Inasmuch as previously referred to U.S. Pat. No. 4,028,847 explains adequately the growth of typical plants during their early growing periods, it will be presumed that the very early periods prior to employing the teachings of our invention result in very little space being required between plants.

Accordingly, FIGS. 1 and 2 depict only a typical growth chamber in which the seedlings or small plants 12a are loaded at the right end, advanced to the left, and unloaded at the left end after they have fully matured. The larger or fully grown plants have been labeled 12c, whereas those plants at various growing stages in between have been denoted by the numeral 12b. The growth chamber 10 comprises a floor 10a, roof or ceiling 10b, sidewalls 10c, 10d, and end walls 10e, 10f. Beneath the roof 10b is an air plenum 14. The chamber 10 further includes an overhead array of high intensity lamps 16 which when practicing our invention may be energized continuously or turned on and off at prescribed times, the lighting schedule being selected so as to promote the best possible growth rate. It is known that plants of certain species will grow best under certain light frequencies. Therefore, the various lamps are selected so as to provide artificial light in the most optimum ranges of frequency.

Inasmuch as certain plants, particularly leafy vegetables, such as various types of lettuce and spinach, require more and more space as they mature, our invention is chiefly concerned with the provision of increased space in accordance with plant growth. Since it is highly important that plants when being grown under soilless or hydroponically controlled conditions receive the proper liquid nutrient, provision is also made for assuring that the nutrient is delivered constantly, or virtually constantly, to the plants during the entire growing cycle, even though they are shifted at various stages of their growing cycle. Actually, in one embodiment there are only short intervals during which the nutrient is shut off, whereas in a second embodiment the flow of nutrient is constant, all as will become clearer as the description progresses.

In U.S. Pat. No. 4,028,847, which has hereinbefore been referred to, the plants are literally fanned out as they mature. While this is a very satisfactory arrangement, it does not provide the flexibility of operation that can be derived from our invention. Furthermore, the referred to patented system cannot be continuously cleaned as far as its troughs are concerned, it being necessary to shut down the system in order to scour the various troughs that are employed.

Therefore, the present invention makes use of equipment that advances the plants 12a from the loading end adjacent the wall 10e to the unloading end adjacent the wall 10f, making certain that the rows of plants 12a that are initially in a very close or proximal relation at the loading end and that the fully matured plants 12c are spaced appreciably apart at the unloading end with the partially mature plants 12b being spaced at lesser intervals in accordance with their lesser size (see the intermediate plants 12b shown in FIG. 21, as an example).

The equipment for progressively advancing the plants 12 from the right to the left in FIGS. 1, 2, 20 and 21 has been indicated generally by the reference numeral 18. Included in the equipment 18 are two sets or units 20a, 20b of laterally spaced tubular screw sections 22, each screw section having a helical tracking groove 24 therein. Since the plants 12 have been generally distinguished by the suffixes "a," "b" and "c," the tubular screw sections 22 will likewise be designated. Therefore, the screw sections for the seedlings 12a are indicated by the numeral 22a, the sections for the intermediate plants 12b by the numeral 22b, and the sections for the mature plants 12c by the numeral 22c. It will be appreciated that the specific number of tubular screw sections will depend upon a number of factors, such as the length of the growth chamber 10, the most practical length of each individual screw section (which is, among other things, influenced by whether the section is extruded or otherwise fabricated), and the type of crop being grown.

As best discerned from FIG. 4, the pitch of the helical grooves 24 contained in the various screw sections 22a at the right or loading end is quite small but increases steadily throughout the sections 22b, and is considerably larger at the left or unloading end where the sections 22c are situated. For example, the pitch of the rightmost tubular screw sections 22a, that is the helical groove 24 contained therein, would be on the order of only one inch, whereas the helical pitch of the helical groove 24 in the sections 22c at the left or unloading end would be on the order of four or five inches. The pitch at the right, as far as the helical grooves 24 are concerned, can be the same for two, three or even six tubular screw sections 22c. The reason for this is that the size of the seedlings is appreciably less during the early portion of the maturing cycle, whereas the foliage requires considerably more space near the end of the growing cycle.

Assuming, as an example, an overall length of 150 feet, then there might very well be, say, fourteen tubular sections. For the sake of discussion, if there are six tubular screw sections 22a having a pitch of 1.0 inch, there could be, for instance, five screw sections 22b having, say, pitches of 1.4, 1.8, 2.2., 2.8 and 3.5 inches, respectively. This would leave three screw sections 22c in each set, and they might very well have pitches of 4.5, 4.75 and 5.0 inches, respectively. Once again, specific lengths of the tubular screw sections and the helical pitches are susceptible to rather wide selection, depending on growth rates, number of plants to be processed, size of chamber, and the like.

At any rate, the helical pitch of any given tubular section 22 should be varied in accordance with the rate of growth of the particular plant 12. In this regard, if Bibb lettuce has a growth cycle of, say, fourteen days, then the pitch of the helical grooves 24 in the various tubular screw sections 22 would be designed so that an appropriate spacing for the particular size of plant at any stage of development would be maintained throughout the fourteen day cycle, the maximum spacing being realized by the time that the lettuce reaches the unloading or harvesting end of the growth chamber 10.

Where a different plant 12 is to be grown having a different growth rate or expected pattern of size change, in most cases, the same tubular screw sections 22a would be used at the right or during the early stages of the maturity cycle, only those toward the left, such as some of the sections 22b and all of the sections 22c, being subject to replacement. In this regard, if leaf lettuce has a growing cycle of only twelve days, the tubular screw sections 22b toward the left and the sections 22c would be replaced to not only take care of the lesser time that this crop would take to reach maturity, but also to increase the space necessary for the increased size of foliage, then the screw pitch would be selected accordingly.

Contrasting FIG. 18 with FIG. 4, FIG. 18 shows tubular screw sections 22d which have been substituted for the sections 22c in order to accommodate for the increased rate of plant growth. In this respect, it is to be noted that the pitch of the helical grooves 224 has been increased over that of the grooves 24 formed in the sections 22c which the sections 22d replace.

Although at this stage of the description the manner in which the plants 12 are contained in parallel rows during the feeding or advancing thereof from the loading end to the unloading end of the growth chamber 10 is not readily understandable, it is believed that the description of the way in which the plants are held during their travel should be reserved for later discussion.

Since the tubular screw sections 22 will at times require some substitution (as explained above), and even if no substitution of screw sections is ever required, the simplicity of mounting the screw sections 22 is an important part of our invention. From FIGS. 7 and 8, the cross sectional make-up of one of the tubular screw sections 22c can be understood; the cross section for the sections 22a and 22b is the same, however. In this regard, the tubular screw section 22c there presented includes a cylindrical exterior casing 26 with inwardly extending radial spokes or webs which support the internal body 30 of the tubular screw section 22c, the body 30 having a noncircular or hexagonal bore 32. Inasmuch as FIG. 6 is a top plan view of FIG. 7, the helical groove 24 appearing in FIG. 7 is toward the left, whereas the helical groove 24 appearing in FIG. 8 is uppermost or at the 12 o'clock position.

Inasmuch as there are two laterally spaced tubular units 20a, 20b, each being composed of a number of screw sections 22a, 22b and 22c, as hereinbefore explained, it is planned that two separate drive mechanisms 34a, 34b be employed. From FIG. 10 it will be seen that each drive mechanism 34a, 34b includes an electric motor 36 which has a drive shaft 38 and a pulley or sprocket 40 keyed thereto. A belt or chain 42 extends to a driven pulley or sprocket 44 on a shaft 46 associated with a gear box 48. The speed of the motor 36 is reduced through the agency of the gear train within the gear box 48 so that a relatively slow speed is made available for the output shaft 50 that projects from opposite ends of the gear box 48.

As can also be learned from FIG. 10, there is a timing wheel 53 that is carried on the end labeled 50a of the output shaft 50 visible in this view. The timing wheel 53 has a lug or ear 54 thereon, which will be further referred to hereinafter. The outer end of the output shaft 50, which has been assigned the reference numeral 50b (FIG. 4) has a hexagonal cross section so as to fit within the bore 32 of the rightmost tubular screw section 22a. This end 50b of the shaft 50 not only rotates the particular screw section 22a with which it is engaged but supports this screw section 22a at the appropriate elevation determined by a stand or support 55 on which the drive mechanism 34a is mounted (as well as supporting the drive mechanism 34b, an intermediate portion of the stand 55 having been removed in FIG. 10 in order to allow use of an enlarged scale).

It is to be observed that the stand 55 is provided with telescoping supporting legs 56a and 56b, a set screw 57 maintaining the legs in an adjusted relation. Although not readily understandable at this stage of the description, the egs 56a and 56b are extended to approximately the same degree, as can be seen in FIGS. 10 and 22, so as to render the stand 55 substantially level, that is, the same height at opposite ends thereof. Stated another way, the unit 20a is at approximately the same height at the loading end as is the unit 20b.

At the left or unloading end of the growth chamber 10, a second stand or support 58 is utilized which rotatably journals an idler shaft 62 at each side having a circular end 62a and a hexagonal end 62b which fits into the bore 32 of the leftmost tubular screw section 22c of each unit 20a, 20b.

The stand 58 is equipped with telescoping legs 59a and 59b with a set screw 60 maintaining the legs in an adjusted relation. In this case, as contrasted to the telescoping legs 56a and 56b at the loading end, the legs 59a, 59b beneath the unit 20b of the unloading end are extended more than under the unit 20a. Here again, the reason for this is not yet readily apparent.

The entire assemblage or unit 20a, 20b, in each instance, of tubular screw sections 22 is urged in the direction of the loading end. To achieve this, a coil spring 64 is interposed between a thrust washer 66 on the stand or support 58, the spring 64 acting against the leftmost tubular screw section 22c. At the right, that is, adjacent each drive mechanism 34a, 34b there is another collar 68 which absorbs the thrust produced by each coil spring 64, the collar 68 being affixed to the shaft 50 so as to transmit the thrust of the unit 20a and the unit 20b derived from the coil springs 64 (there being one such spring 64 for each unit 20a, 20b) via the shafts 50 into the gear boxes 48 of the drive mechanisms 34a, 34b.

Whereas the drive mechanism 34a rotates one end of the tubular screw unit 20a and the mechanism 34b the other unit 20b, it is necessary that the various screw sections 22a, 22b and 22c be coupled together so that all of the sections 22 of each unit 20a and 20b rotate in unison. Accordingly, a coupling member 70 is inserted into the bores 32 of adjacent end portions of each tubular screw section 22. Owing to its haxagonal cross section, the coupling member 70 is keyed within the hexagonal bores 32 and the driving torque supplied by the two drive mechanisms 34a, 34b is transmitted from one tubular screw section to the next. Preferably, the screw sections 22 and couplers 70 are provided with registrable transverse passages for the accommodation of pins 71 (see FIG. 5) which preclude any longitudinal shifting of the coupler 70.

Of course, it will be appreciated that in inserting the various couplers 70, the rightmost tubular screw section 22a is placed over the end 50b of the shaft 50 belonging to each drive mechanism 34a, 34b, and then the first coupler 70 is inserted into the left end of the bore 32 for that particular tubular screw section 22. Then, the next tubular screw section 22a is placed over the projecting end of the first coupler 70 and this is repeated throughout the entire unit 20a and 20b of tubular screw sections 22. As already indicated, the pins 71 can be employed to prevent any longitudinal movement of the couplers 70 within the various screw sections 22a, b and c.

Owing to the combined length of the various tubular screw sections 22 constituting the unit 20a and the unit 20b, it is necessary to employ a number of bearing assemblies so as to permit the free rotation of the various screw sections 22. These assemblies have been indicated generally by the reference numeral 72. One such assembly 72 is detailed in FIGS. 6 and 7. From these two figures it will be discerned that each assembly 72 comprises a base plate 74 and parallel upstanding sidewalls 76, 78. Journaled in the sidewalls 76, 78 are short shafts or pins 80, each having a roller 82 thereon. Entrained about the two rollers 82 of each assembly 72 is a flexible belt 84, the belt having sufficient slack therein so as to partially cradle or encircle the underside of the particular tubular screw section 22 which it is intended to rotatably support.

The various bearing assemblies 72 are mounted on stands or frames comprised of telescoping legs 86a and 86b, the legs 86a and 86b of the stands 86 being held in an adjusted relation by means of a set screw 87. The telescoping legs 86a, 86b, maintain intermediate sections of the unit 20a, 20b at the appropriate elevations or heights.

It will be recognized that the units 20a, 20b containing the various tubular screw sections 22 will have lengths on the order of 150 feet. Inasmuch as the lengths of each screw section 22 will under these circumstances be approximately ten or eleven feet in length, it follows that a sufficient number of bearing assemblies 72 and stands 86 should be utilized so as to maintain the tandemly arranged sections 22 generally horizontal. Actually, the unit 20a slopes downwardly from the loading end thereof toward the unloading end thereof with respect to the unit 20b. Still further, it will be evident that the cradling support provided by each bearing assembly 72 does not interfere with the facile replacement or substitution of one tubular screw section 22 for another, which may at times be necessary when a change in the helical pitch of the grooves 24 is desired in order to accommodate for a different growth rate of a different species of plant.

As can be understood from FIGS. 1, 2 and 18, a plurality of elongated troughs 88 is for the purpose of holding the various plants 12 during their entire growth cycle. These troughs 88 can have a length of approximately 18 feet or so; the specific length is really a matter of choice and design. Lengths of this magnitude can readily accommodate 55 or so seedlings at a spacing therebetween of approximately four inches, assuming a final growing space requirement of this magnitude. It is believed readily apparent that the troughs 88 can be quite narrow, and actually have a width of approximately 0.984 inch measured from one side to the other.

One of the troughs 88 is shown in section in FIG. 9. It will be perceived that the trough 88 there appearing has parallel sidewalls 90, 92 and a bottom wall 94. Integral with the bottom edges of the sidewalls 90, 92, and projecting beneath the bottom wall 94 are a pair of sawtooth or notched flanges 96 for a purpose presently to be explained. At opposite ends of each trough 88 are caps or end walls 97 and 98, the end wall 98 functioning as a weir, which together with the slope of the trough determines the level of the liquid nutrient. At this time especial attention is directed to FIGS. 22 and 23 where the slope of a trough 88 adjacent the loading end of the chamber 10 can be compared with the slope of a trough 88 of the unloading end. The lesser slope appearing in FIG. 22 is readily realized by extending the legs 56a, 56b at the left as viewed in FIG. 10 (or at the right as viewed in FIG. 22). Just the converse is done in FIG. 23 for there the legs 59a, 59b at the left are extended more. Various jacking arrangements can be employed to provide whatever trough inclination is best for the nutrient flow that is needed at any particular growth stage. Still further, because of the inherent resiliency present as far as the sidewalls are concerned, they can be flexed apart sufficiently so as to permit the gripping of a number of caps or short strips 100, more specifically their downturned edges 102. Each strip 100 has a centrally located aperture 103 therein for the accommodation of a plant 12 in a manner referred to later.

Releasably retained by the resilient sawtooth flanges 96 are drive pin units 104 which can be fabricated from an appropriate plastic, such as polyethylene. More specifically, the sides of the drive pin units are notched at 106 so as to releasably receive therein portions of the sawtooth flanges 96. Integral with the underside of each unit 104 is a downwardly projecting drive pin 108 which engages in the helical grooves 24 of the various tubular screw sections 22. In this way, it should be readily apparent that when the screw sections 22, that is, the entire units 20a and 20b, are rotated by the two drive mechanisms 34a and 34b, the engagement of the drive pins 108 in the helical grooves 24 will cause the opposite ends of the troughs 88 to be moved from the loading end to the unloading end of the growth chamber 10.

Whereas the drive pin units 104 are held by the downwardly projecting sawtooth flanges 96 at the ends of each trough 88, a similar unit 104a is located centrally of each trough 88, the additional unit 104a having a downwardly projecting guide pin 108a. The guide pin 108a is constrained for rectilinear movement in a longitudinal direction of the growth chamber 10 by a channeled track 110 best viewed in FIG. 11, although the track 110 also appears in FIGS. 19 and 21. From FIG. 11 it will be seen that the channeled track 110 makes use of rubber or plastic buffers or elongated pads 112 which have grooves 114 formed therein so that the buffers 112 can be fitted over the upper margins of the channel-shaped track 110. From FIG. 4, it will be observed that the track is supported on an A-frame 116, there being a number of such frames 116 longitudinally spaced throughout the length of the growth chamber 10.

It has already been explained that the various seedlings or small plants 12a are spaced approximately four inches apart in the various troughs 88. From FIG. 9, it can be noted that the seedlings 12a are held in a number of fibrous growth pads or blocks 118 which can be fabricated from inexpensive waste products of wood and/or paper, peat, sphagnum moss, plastic foam, or various fibers. More specifically, the body 120 of each fibrous block 118 is tapered downwardly. At the upper end of the block 118 is an integral flange 122 which rests upon and is supported on the upper sides of the caps or strips 100 of the trough 88.

Although not important to an understanding of the present invention, each growth block 118 is recessed (not visible) at its upper end so that initially a seed can be placed thereon and permitted to germinate in a starter chamber, as already alluded to. It has been pointed out that for Bibb lettuce the particular troughs 88 would be contained in a starter chamber for seven or eight days and then transferred to the loading end of the growth chamber 10 for advancement therethrough from the loading end at the right to the unloading or harvesting end at the left.

It is preferable that the body 120 of the fibrous growth block 118 have a depth depending downwardly from the flange 122 sufficient so that the lower end rests upon the bottom wall 94 of the trough 88. This enhances the stability of each block 118. More specifically, the flange 122, in each instance, rests upon the upper face of the various caps 100, as already mentioned, and the lower end of the growth block 118 rests upon the bottom wall 94 of the trough 88, as explained just above.

Still further, it is planned that the various apertures 103 in the caps or holding strips 100 be of a size only slightly larger than the cross section of the tapered body 120 at the upper end thereof, thereby contributing to the stability of the growth blocks 118. This becomes most important as the plants 12c reach maturity, for the foliage can then become quite massive, yet with the described growth block 118 there is little likelihood of any tippage occuring because of the above-mentioned stability.

An important feature of our invention is the manner in which the liquid nutrient is delivered to the various troughs 88. In this regard, the troughs 88 can be progressively expanded or separated without interference from any plumbing used in the supplying of the liquid nutrient to the troughs 88.

Although more will be presented shortly with respect to the electrical controls for the motor 124 (see FIG. 10) which drives the pump 126 (see FIG. 13), it can be stated that the pump 126 supplies an elongated manifold 128 with the liquid nutrient, doing so through a supply tube 130 (FIGS. 12 and 13) connecting with a manifold inlet hole at 132. It is to be understood that the solution constituting the nutrient can vary quite widely as to its composition, depending largely upon the specific type of plant 12 being grown. Generally, it can be mentioned that the solution should be fortified with such elements as nitrogen, potassium, phosphorus and certain trace elements.

The manifold 128 extends the complete length of the tandemly connected tubular screw members 22. However, a series of smaller manifolds can be employed as long as nutrient is supplied to the raised ends of all of the troughs 88.

A number of outlet holes 134 are provided at the top of the manifold 128, there being a hole 134 for each trough 88 to be supplied with nutrient. It is readily apparent that the total number of troughs 88 can be predetermined and the proper number of holes 134 formed in the manifold 128 to accommodate the various groups of troughs 88 to be advanced through the growing chamber 10.

From FIG. 13, it will be noted that a section of the sidewall 106 is presented having a number of longitudinally spaced recesses 136, there being a rod 138 spanning each recess 136. A support designated generally by the reference numeral 140 includes a hook 142 for each rod 138 which engages over each rod 138. The support 140 further includes a vertical plate or strip 144, the hooks 142 being at the upper edge of this plate 144. The plate 144 additionally includes a series of upwardly facing hooks 146 at its lower end which hooks cradle the nutrient supply manifold 128. The plate 144 also performs another function, as will become clearer shortly. At this time, though, it need only be explained that the plate 144 has upper and lower horizontally projecting flanges 148 and 150, respectively, with downwardly and upwardly facing grooves 152 and 154 which releasably hold or mount a vertical panel 156 having a multiplicity of small apertures 158 therein.

The number of outlet or discharge holes 134 in the manifold 128, as already stated, corresponds to the total number of troughs 88 that are to be advanced from the loading end to the unloading end of the growth chamber 10. Since the liquid pressure developed by the pump 126 is not great, it is relatively easy to insert the lower ends of the proper number of flexible nutrient delivery or supply tubes, which have been identified by the reference 160 into the various outlet holes 134 in the manifold 128. This is best understood from FIG. 13. The flexible delivery tubes 160 extend upwardly through an equal number of relatively rigid plastic outer tubes 162 which have downwardly curving upper ends forming an inverted J configuration. A pair of vertically spaced clips 164 for each outer tube 162 have a split or slotted head 166 of an appropriate size so that each head 166 can be pressed into appropriately selected apertures 158 in the panel 156. In this way, when a delivery tube 160 is to be repositioned, all that the operator need do is to retract or pull out the clips 164 on the particular outer tube 162 through which that flexible tube 160 extends from their respective apertures 158 and then shift them either to the right or left, as viewed in FIGS. 12 and 14, so that the delivery tubes 160 will have a spacing corresponding to the pitch of the helical grooves 24 residing at that particular growing station.

Preferably, a guard 168 extends over the upper or discharge ends of the various delivery tubes 160. The guard 168 shown in FIG. 13 curves downwardly over the tubes 160, being attached to the wall 106 by means of two vertically spaced screws 170, there being various pairs of such screws 170 at longitudinally spaced intervals along the wall 10c. Also, U-shaped resilient molding 172 has been applied along the free edge of the guard 168, the molding being located just above the upper edges of the trough sidewalls 90, 92.

It will be apparent that the nutrient supplied via the delivery tubes 160 enters one end of the various troughs 88, and in the process passes the various growth blocks 118, enabling the growth blocks 118 to assimilate or absorb some of the nutrient. In a wick-like fashion, the liquid nutrient moves upwardly through the fibers constituting the various growth blocks 118.

Not all of the nutrient delivered into the troughs 88 is assimilated by the plants 12. Some of it continues to the lower end of the troughs 88, these ends being over the tube unit 20b. For the purpose of collecting the surplus nutrient that is not used on a given pass through the troughs 88, a longitudinally positioned drain gutter 174 is used. The drain gutter 174 simply collects the excess nutrient from each trough 88 and, owing to the slight inclintion imparted thereto, the surplus nutrient that is thus collected drains toward the loading end of the chamber 10, discharging into the intake side of the pump 126 so that it can again be recirculated through the system comprising the manifold 128 and the various troughs 88 containing the plants 12 therein. A drain guard 176 resembling the guard 168 is attached to the sidewall 10d of the growth chamber 10, projecting over the gutter 174, as can be perceived in FIG. 3.

Although the drive mechanisms 34a, 34b could be operated continuously, decided advantages flow from having them operated only intermittently. If there were a continuous rotation of the two tubular units 20a and 20b, then there would be a continual discharging of troughs 88, one at a time, at the unloading end of the growth chamber 10 which would require an attendant or operator to be present all the time, or at least necessitate some form of automated removal equipment.

Therefore, in order to stop and start the tubular units 20a, 20b which include the various tubular screw sections 22a, 22b and 22c, an electrical circuit for achieving this is schematically set forth in FIG. 10. In actual practice, a microswitch would be employed. However, the two diagrammatically depicted switches 180a, 180b in FIG. 10 each include a pair of resilient arms or leaf springs 182, 184 having contacts 186, 188 thereon. The resilient arm 182 is biased downwardly so as to normally close the contacts 186, 188. However, in the position illustrated in FIG. 10, the contacts 186, 188 are open or separated, having been separated by the lug or ear 54 on the timing wheel 53 which simply raises the upper spring arm in each instance so as to open the contacts. Connected to the upper contact 186 is one side of power supply 190 for the motors. Only a battery has been diagrammatically shown as the power supply 190; in practice, the supply would be an alternating power source and the motor 36 in each instance a synchronous one. The other side of the source or supply 190 is connected to one terminal of the motor 36 of each drive mechanism 34a, 34b and the other terminal of the motor 36 is connected to the lower switch contact 188.

A pushbutton switch 192 is connected in parallel with both switches 180a, 180b. For the sake of simplicity the pushbutton switch 192 has been shown at the loading end of the growth chamber 10; in practice, it would be at the unloading end as will presently become manifest. When the pushbutton switch 192 is closed, then the source of power 190 is connected directly to the two motors 36. However, once the motors 36 have caused their pulleys or sprockets 40 to rotate the other pulleys or sprockets 44 via the flexible belt or chain 42 sufficiently, the timing wheel 53 shifts the lug 56 from its 12 o'clock position to, say, its 1 o'clock position. This allows the switch contacts 186, 188 of both switches 180a, 180b to close, being normally biased to a closed position. The operator can then release the pushbutton for the switch 192 and rotation will continue for a full revolution of each tubular unit 20a, 20b. Inasmuch as the timing wheel 53, being on the end 50a of the output shaft 50, rotates in unison with its particular tubular unit 20a, 20b, the switch contacts 186, 188 in each instance will open at the end of each revolution.

At this stage, it will also be pointed out that when the tubular units 20a, 20b are being rotated by the drive mechanisms 34a and 34b, more specifically by reason of the energization of the motors 36 thereof, as explained above, the delivery of the liquid nutrient may be shut off. While a number of ways of doing this are available, a simple expedient has been diagrammatically shown in FIG. 10. More specifically, the switch arm or finger 182 is of sufficient length so as to extend to the right past or over the timing wheel 53. In this way, it can carry a contact 194 at its free end which is normally in engagement with a fixed contact 196. The movable contact 194 and the fixed contact 196 are in circuit with a source 198 of power, here again illustrated as a battery, with the pump motor 124 in this way being energized only when the tubular units 20a, 20b are not rotating. Thus, each time that the switch contacts 196, 198 are opened or separated, then the pump motor 124 stops and the flow of nutrient into the manifold 128 stops and the flow into the various nutrient delivery tubes 160 is halted, too, until the pump motor 124 is again energized. Since the pump motor 124 need not be stopped for prolonged periods of time, the flow of nutrient through the various troughs 88 continues because of the time that it takes for the surplus nutrient already in the troughs to pass therethrough to the drain end overhanging the gutter 174.

Whereas the foregoing arrangement has been concerned with the stopping of the pump 126, it is within the purview of the invention to permit the pump motor 126 to remain energized continuously and still avoid spillage of the nutrient while the troughs 88 are being shifted or advanced. Therefore, the embodiment illustrated in FIGS. 15-17 will now be described.

Figure 17:
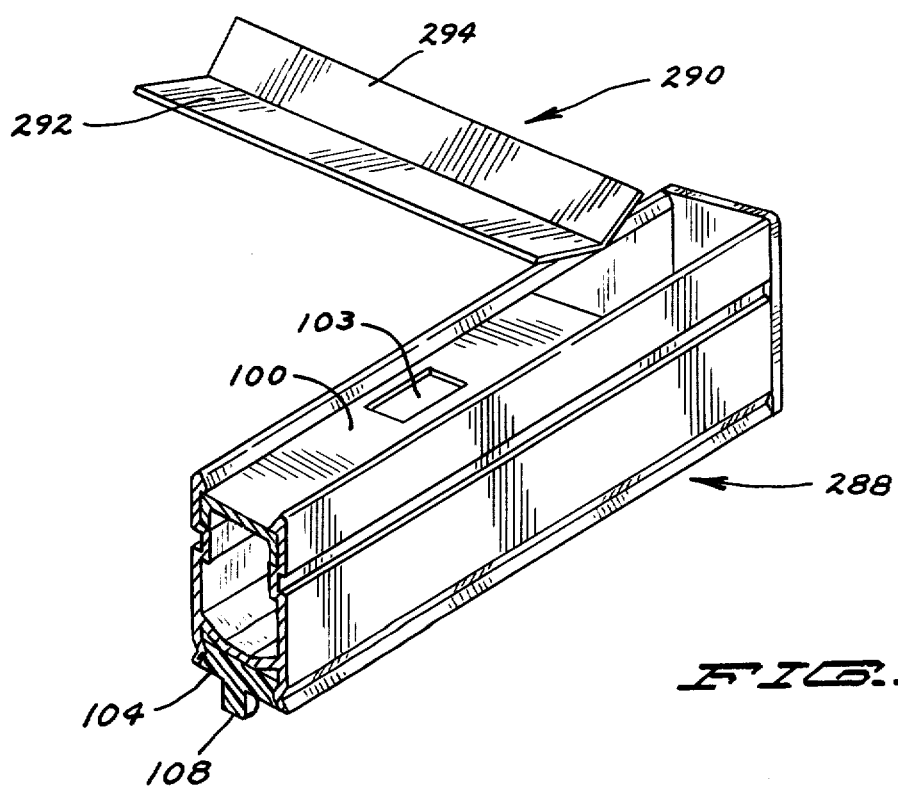
FIG. 17 is a fragmentary perspective view of one of the troughs of FIGS. 15 and 16 for the purpose of illustrating the deflector that is attached thereto.

Referring to FIG. 17, it will be discerned that the trough 288, which corresponds functionally to the trough 88 has an inclined extension or lip at one end thereof which will be termed a chute or deflector and denoted generally by the reference numeral 290. More specifically, the deflector 290 has a shallow V-shaped cross section, having inclined or upwardly sloping bottom walls 292 and 294.

Figure 15:
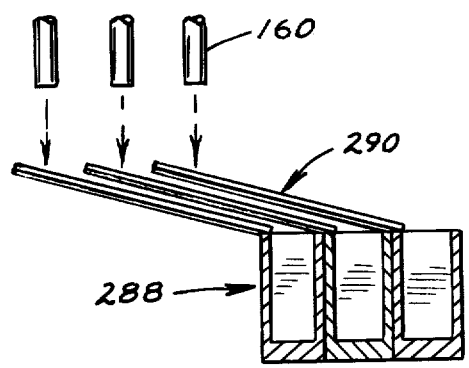
FIG. 15 is a view corresponding to FIG. 12 but depicting troughs with overlapping deflectors which guide a continuous flow of nutrient from the delivery tubes into the troughs.
Figure 16:
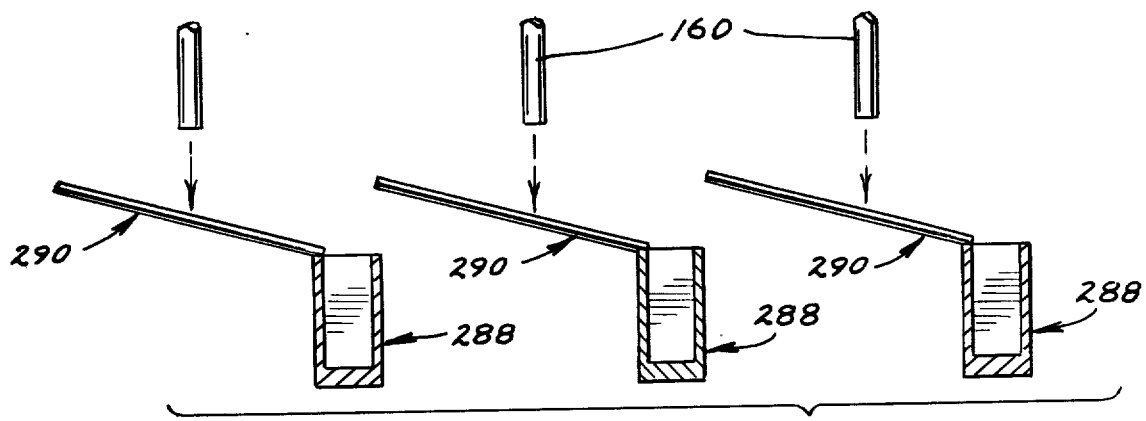
FIG. 16 is a view showing the overlapping relation of the deflectors of FIG. 15 when the troughs have been spaced to the extent appearing in FIG. 15.

FIG. 15, as far as trough spacing, corresponds to FIG. 12, and FIG. 16 corresponds to FIG. 14. In view of FIG. 17, however, FIGS. 15 and 16 can be presented rather diagrammatically in showing the overlapping relationship of the chutes or deflectors 290, both at the loading end (FIG. 15) and the unloading end (FIG. 16). It is believed evident from FIG. 16 that even when the troughs 288 are spaced their maximum distance apart, which is on the order of four or five inches, there is still some overlapping of the deflectors 290. Consequently, the nutrient discharged from the delivery tubes 100 will at all times be guided or directed into a trough 288. In this regard, it will be understood that the delivery tubes 160, owing to the releasable manner in which they are held in place by the clips 164 can be spaced at appropriate locations on the panel 156 in virtually the same fashion as when the pump 126 is to be stopped and started. Inasmuch as there is always an overlap of the deflectors 290, even though the degree of overlap varies, there is never any spillage of nutrient.

Having presented the foregoing information, it will now be mentioned that it is contemplated that, say, a group of 60 troughs 88 be introduced at the loading end at one time and that these various troughs 88 be advanced as a group through the growing chamber 10 at the end of successive one day periods. Consequently, when the plants 12c have fully matured and are to be removed at the unloading end, then the operator can remove 60 troughs virtually at the same time in contradistinction to removing one trough at a time which would be the situation if the drive mechanisms 34a, 34b were operated on a continuous basis.

It is believed that a specific example will be helpful in fully understanding and appreciating the benefits to be derived from our invention. Assuming that 60 troughs have been taken from the starter chamber (not illustrated) and that the seedlings 12a are of sufficient maturity to warrant advancement through the growth chamber 10 so as to enable them to fully mature, then the 60 troughs are placed in close proximity to each other at the right or loading end of the growth chamber 10 as viewed in FIG. 2. It has already been mentioned that the width of each trough 88 (and the same holds true for the troughs 288) is slightly less than one inch, more specifically 0.984 inch, so under these conditions the pitch of the helical grooves 24 at the right or loading end would have a pitch of exactly one inch. This permits a slight clearance between each trough 88 (and 288).

Once the first group of troughs 88 have been placed on the rightmost tubular screw sections 22a of the units 20a, 20b, they simply repose at this end for an appropriate period or portion of the growing cycle. For the sake of discussion, this may be considered to be until virtually a full first growing day has been completed. In other words, the plants or seedlings 12a may remain stationary for, say, 23½ hours. This would constitute almost a full day. As a practical matter, the stopping and starting, that is, the intermittent advancement or movement of the troughs 88 (and 288) through the chamber 10 is for operating convenience of the personnel and to suit harvesting schedules. The total time within the chamber, though, depends on the growth cycle of the particular plant 12. In any event, at the end of the first day or first growing period, the pushbutton switch 192 shown in FIG. 10 can be closed which will start the electric motors 36 belonging to the drive mechanisms 34a, 34b.

Once depressed or closed, then the switch 192 initiates a circuit for the electric motors 36, causing the tubular screw sections 22 of both units 20a, 20b to rotate, and at the same time causing the timing wheel 53 to rotate with the consequence that the lug 54 is shifted from its 12 o'clock position so as to permit the switch contacts 186, 188 to close, the closing of these contacts 186, 188 making it no longer necessary for the operator to keep the pushbutton switch 192 closed. The lug 54 on the timing wheel 53 will rotate a full revolution and will automatically open the switch contacts 186, 188 to stop both motors 36 of the two drive mechanisms 34a and 34b.

During the full revolution that is realized from the foregoing operation described immediately above, the contacts 196, 198 in circuit with the pump motor 124 are opened so that the pump 126 no longer pumps liquid nutrient into the manifold 128. This shuts off the flow of liquid nutrient through the various delivery tubes 160 during the brief interval required to advance the first group of troughs from one growing station to the next. In this way, spillage from the delivery tubes 160 is obviated during the actual shifting of the troughs 88 from one position to the next.

When the troughs 288 of FIGS. 15-17 are utilized, then the pump motor 128 can run continuously for the chutes or deflectors 290 simply guide the liquid nutrient from the various delivery tubes 160 into the troughs 288 with which they are associated. Of course, the precise delivery tube 160 is releasably clamped in an offset relation from the particular trough 288 it is intended to supply at any given growing station. The heads 166 of the clips 164 can readily be inserted in the most appropriate panel apertures 158 to achieve the progressively increasing spacing that corresponds to the increased trough spacing.

It has already been stated that groups of troughs 88 will be intermittently advanced or moved through the growing chamber. Since 60 troughs have more or less arbitrarily been selected, the operator will actually close the pushbutton switch 192 sixty times so as to advance the first group of troughs 88 (or 288) to the next growing station.

While at the first or initial growing station, the high intensity lamps 16 can be turned on for whatever period that is most beneficial for the variety of plant 12 being hydroponically cultivated. One of the advantages of our invention is that the illumination period can be selected for any desired interval and the lamps 16 then turned off, or the lamps 16 can be left on continuously if the stage of plant growth so warrants. The invention allows this to be done very readily. In any event, the plants 12 which are in rows, being in the various troughs 88 (or 288) which are parallel to each other, are not advanced through light and dark chambers as previously done.

The plants will not have grown very much during the first day's growing period. Therefore, when advanced to the second growing station which represents the second day's growth period, the helical pitch for the grooves 24 of the next or second from the right tubular screw sections 22a in each unit 20a, 20b can be the same as the pitch for the first or rightmost sections 22a. In other words, the first pitch for the first station was selected to be one inch, and the pitch for the second station can be the same.

It is believed evident that once the first group of troughs has been advanced to the second growing station, that is, where the second growing day is to take place, then a second group of 60 troughs 88 (or 288) can be taken from the starter chamber so as to follow the first group through the growth chamber 10.

However, as the various troughs 88 (or 288) progress in a direction perpendicular to their longitudinal axes, the rate of growth of the plants 12a soon dictates that there should be more and more spacing between the parallel troughs 88 in order to provide enough spacing between the various rows of plants. Consequently, the pitch can be increased at the appropriate growing station, that is, on the proper day, say, from the one inch to 1.4 inch. This may be postponed to the sixth or seventh day, or may be accomplished earlier -- all depending on the type of plant and the increase in space that is needed during its growing cycle.

As the plants 12b continue to move through the growing chamber 10, the pitch will be further increased so that when the plants reach the harvesting or unloading end, the pitch of the tubular screw sections 22c at this final growing station would be on the order of five inches. It will be recalled that the lateral spacing of the plants within each trough was initially selected to be four inches. Thus, sufficient space was allowed at the outset for lateral expansion of the plants 12 as they move through the growing chamber 10 but the longitudinal spacing is increased by reason of the increased helical pitch.

It should be understood that the longitudinal spacing of the various delivery tubes 160 for the nutrient should be correlated with the pitch of the helical grooves 24. This is important so that each time that the tubular screw sections 22 stop rotating, as they will do through the agency of the circuit arrangement depicted in FIG. 10, each trough 88 should be in registry or alignment with a delivery tube 160. When using the troughs 288, quite obviously, the direct registry required between a given delivery tube 160 and a trough 88 is not resorted to; instead, the particular trough 288 is offset from the delivery tube 160 supplying it with nutrient, the nutrient being received via the deflector 290 associated with that trough 288.

While it has been somewhat simpler to refer to the actuation of the pushbutton switch 192 sixty times in order to advance a group of 60 troughs 88 (or 288) from one growing station to the next, it will be recognized that a counter can be incorporated into the circuitry of FIG. 10 so that the closing of the pushbutton switch 192 but once will cause the various tubular screw sections to rotate a total of sixty times. However, it facilitates the removal of the various troughs 88 and 288 at the unloading or discharge end of the chamber 10 to have the pushbutton switch 192 operated once for each revolution and to do so at the unloading end so that the operator or operators can take off one or two troughs 88 or 288, as the case may be, then a couple more, and so on while stopping and starting the drive mechanisms 34a, 34b. In this way, the operator can close the pushbutton switch 192 any number of times so as to make it easier for him to remove the troughs 88 (or 288) at intervals most convenient for him.

The preceding description has dealt with a growth cycle of fourteen days, but the period in practice is governed by whatever overall or complete period that is needed for a specific species of plant. In other words, each 60 revolutions constitutes a growing period. When operating intermittently, the change from one growing period to the next can take place in very little time, not more than one-half hour. Here again, the time between advancements is dictated largely by operating convenience, such as the capability of personnel to remove the troughs 88 or 288, and is also geared to harvesting schedules which, of course, are influenced by growth rates. Of course, the system can be operated on a continuous basis, but, as already pointed out, then possesses the disadvantage of having to constantly load and unload the troughs.

The invention takes into consideration the desirability of switching from one crop to another. Crops, quite obviously, may have radically different growing rates. Thus, where a larger spacing between plants of a given species is to be realized, then the operator would substitute the tubular screw sections 22d having a greater helical groove pitch for the sections 22c. On the other hand, if the spacing between plants 12c is to be less, owing to the growing of plants that reach a lesser size, then tubular screw sections having a helical groove pitch less than the five inches would be substituted at the harvesting end. Quite obviously, any number of the intermediate tubular screw sections 22b can be substituted when circumstances so dictate.

The ease with which the tubular screw sections 22 can be detached from their tandem relationship has already been explained. All that need be done is to shift the support 60 at the left in FIG. 4 farther to the left and simply pull off whatever number of screw sections 22c (and 22b) that are to be replaced, then substituting other screw sections 22, such as those labeled 22d having the helical grooves 224 in FIG. 18, possessing the appropriate helical pitch. The simplified coupling arrangement provided by the hexagonal couplers 70 makes this possible, together with the very simple bearing support assemblies 72 that have been pictorially presented in FIGS. 6 and 7.

Consequently, it should be obvious that our apparatus and method is exceedingly versatile and makes an efficient use of all of the space and light available in any given size growing chamber. Also, very little manual attention need be devoted to the entire procedure. Actually, it is really only at the end of each growing interval that any attention need be devoted, and this is really just to load into the apparatus additional troughs 88 or 288 in groups of whatever number have been selected and to remove a corresponding number from the discharge or harvesting end.

We claim:

1. A method of growing plants comprising the steps of arranging said plants in parallel troughs for advancement in a one direction perpendicular to said troughs, interconnecting said troughs with varied pitch helical means, and rotating said helical means in a direction to increase the spacing between said plants as said plants are advanced in said one direction.

2. The method of claim 1 including the step of maintaining a fixed spacing between said plants in a direction transverse to said one direction as said plants are advanced in said one direction.

3. The method of claim 2 in which said plants are intermittently advanced in said one direction.

4. The method of claim 3 in which said plants remain stationary for a period between periods of advancement.

5. The method of claim 4 in which said periods of advancement are appreciably shorter than the periods during which said plants remain stationary.

6. The method of claim 1 in which the pitch of said helical means is increased in proportion to the increase in size of said plants.

7. The method of claim 6 including the step of subjecting said plants to artificial light.

8. The method of claim 1 including the steps of positioning said plants within a growing chamber in closely spaced rows by locating said troughs relatively close together, allowing said plants to partially mature during a first growing period while closely spaced with respect to each other, said advancing and increasing steps repositioning said troughs and the plants therein with a greater spacing between said troughs and rows of plants by increasing the pitch of said helical means, and allowing said plants to further mature during a second growing period.

9. The method of claim 8 in which said plants are stationary during said first and second growing periods.

10. The method of claim 9 including the step of subjecting said plants to artificial light during at least one portion of each of said growing periods.

11. The method of claim 10 including the steps of further repositioning said troughs and the plants therein with still greater spacings between said troughs and the rows of plants, and repeating said repositioning steps to provide a sequence of growing periods until said plants have fully matured.

12. The method of claim 11 including the step of supplying a nutrient to said plants.

13. The method of claim 12 in which said nutrient is supplied to said plants at one end of each trough.

14. The method of claim 13 including the step of discontinuing the supply of nutrient to said one end of each trough during the advancing of said troughs between said first and second growing periods.

15. The method of claim 1 including the steps of positioning said plants in parallel troughs, delivering a liquid nutrient into one end of each trough, and controlling the depth of nutrient in at least one trough by adjusting the elevation of the other end thereof with respect to said one end thereof.

16. The method of claim 1 in which said increase in spacing is obtained by increasing the helical pitch for plants having a given expansion rate.

17. The method of claim 16 in which said helical means includes a first screw section having one screw pitch and a second screw section having a greater screw pitch, said second screw section being connected in tandem with said first screw section to provide said increased helical pitch.

18. The method of claim 17 in which said helical pitch is increased to a still greater extent to provide a still greater spacing for other plants having a still greater expansion rate.

19. The method of claim 18 in which said helical means includes a third screw section having a still greater screw pitch than said second screw section, the method including the step of substituting said third screw section for said second screw section to provide said still greater spacing to accommodate said other plants having said still greater expansion rate.

20. The method of claim 19 including the step of supplying a liquid nutrient to said plants at locations in accordance with the pitches of said first, second and third screw sections.

21. Apparatus for growing plants comprising a plurality of generally parallel troughs for holding a number of individual plants, varied pitch screw means for increasing the spacing between adjacent troughs in a direction perpendicular to said troughs as the plants mature, means interconnecting said troughs with said screw means, and means for rotating said screw means to effect said increase in spacing between adjacent troughs.

22. The apparatus of claim 21 in which said screw means for increasing the spacing between adjacent troughs includes a plurality of screw members.

23. The apparatus of claim 22 in which said each screw member is tubular and provided with a helical groove therein, and said interconnecting means includes a drive pin on each of said troughs extending downwardly into the helical groove of at least one of said tubular members.

24. The apparatus of claim 23 including means for stopping and starting said rotating means.

25. The apparatus of claim 24 including lamp means above said troughs for illuminating said plants.

26. The apparatus of claim 21 in which said screw means for increasing the spacing between troughs includes a series of longitudinally coupled tubular screw sections, the apparatus further including a plurality of longitudinally spaced tubes for feeding a nutrient into said toughs, said delivery tubes having a spacing therebetween correlated with the pitch of said tubular screw sections.

27. The apparatus of claim 26 including a feed tube at one end of each trough for delivering a nutrient into said one trough end, said tubes being spaced apart in accordance with the pitch of said screw sections and means for rotating said tubular screw sections to position said troughs relative to said delivery tubes.

28. The apparatus of claim 27 including means for relatively adjusting the height of the other ends of said troughs with respect to said one ends.

29. The apparatus of claim 21 in which said screw means for increasing the spacing between troughs includes a number of longitudinally extending tubular screw sections, each screw section being provided with a helical groove and the pitch of at least some of said helical grooves increasing in said perpendicular direction.

30. The apparatus of claim 29 including a longitudinal guide for constraining said troughs to move in a rectilinear path, and said interconnecting means including means projecting from each trough into said helical grooves so that said troughs are advanced in accordance with the pitch of said helical grooves.

31. Apparatus for hydroponically growing plants comprising first and second groups of longitudianlly spaced delivery tubes for feeding a nutrient to the plants to be grown, a group of elongated troughs for containing seedlings to be matured, varied pitch screw means for advancing said group of troughs from a first growing station having a preferred relation with said first group of delivery tubes into a second growing station having a preferred relation with said second group of delivery tubes, means interconnecting said troughs with said screw means, and means for rotating said screw means, the pitch of said screw means at said second growing station being greater than the pitch of said screw means at said first growing station.

32. The apparatus of claim 31 in which said preferred relation in each instance constitutes a direct alignment between said troughs and said tubes.

33. The apparatus of claim 31 in which said preferred relation in each instance constitutes an offsetting between said troughs and said tubes, and means for deflecting nutrient from a delivery tube into one of said troughs.

34. The apparatus of claim 33 in which said deflecting means includes a deflector inclining upwardly from one end of each of said troughs.

35. The apparatus of claim 34 in which adjacent deflectors overlap each other in both said first and second positions.

36. The apparatus of claim 31 in which said first and second groups of delivery tubes feed said nutrient into one end of said troughs, and means for relatively adjusting the other ends of said troughs relative to said one ends in order to control the depth of nutrient flowing through said troughs from said one ends to said other ends.

37. The apparatus of claim 31 in which the delivery tubes of said first group have a lesser spacing therebetween than the spacing of the delivery tubes in said second group, and the spacing between said troughs is increased by said advancing means from that of said first group of delivery tubes to that of said second group of delivery tubes during movement of said troughs from said first station to said second station.

38. Apparatus in accordance with claim 31 including means for adjustably mounting said first group of delivery tubes so that the spacing therebetween can be changed, and means for adjustably mounting said second group of delivery tubes so that the spacing therebetween can be changed.

39. The apparatus of claim 38 in which said means for changing the spacing between said delivery tubes in said first group and said means for changing the spacing between said second pair of delivery tubes includes a panel having a multiplicity of apertures therein, a pair of clips fastened to each delivery tube, said clips each having a split head insertable in selected ones of said apertures in order to obtain a spacing between the delivery tubes of said first group in accordance with the pitch at said first growing station and in order to obtain a spacing between the delivery tubes of said second group in accordance with the pitch of any replacement screw sections having still different pitches.

40. Apparatus for growing plants comprising first and second elongated troughs, means in each trough for holding a series of laterally spaced plants, a plurality of longitudinally coupled screw sections for moving said troughs in a direction perpendicular to the longitudinal axes of said troughs, the pitch of said screw sections increasing in said perpendicular direction so that the spacing between said troughs is increased when said troughs are moved from a first growing station to a second growing station, whereby at least one of the screw sections can be replaced with another screw section having a different pitch in order to accommodate plants having a different plant growth.

41. Apparatus for hydroponically growing plants comprising a plurality of troughs, a drive pin extending downwardly from each end of each trough, a pair of laterally spaced elongated units, each unit including a series of tandemly and longitudinally arranged tubular screw sections with each screw section being formed with a helical groove, the drive pins of one end of said troughs extending downwardly into the helical grooves of one of said units and the drive pins at the other ends of said troughs extending downwardly into the helical grooves of the other of said units, a guide pin extending downwardly from an intermediate portion of each trough, and a channel-shaped track into which said guide pins extend for guiding said troughs in a rectilinear direction.

42. The apparatus of claim 41 in which said tubular screw sections have a hexagonal bore, and a coupling member having a hexagonal cross section and end portions of said coupling member being received in the hexagonal bores at the ends of adjacent tubular screw sections so as to couple the screw sections of each unit together.

43. The apparatus of claim 42 including means for stopping and starting said rotating means, and a plurality of delivery tubes for feeding a liquid nutrient into said troughs, said delivery tubes being spaced in accordance with the pitch of said helical grooves.

44. The apparatus of claim 43 including means associated with said rotating means for stopping the delivery of nutrients into said troughs when said rotating means is rotating said units to advance said troughs.

45. The apparatus of claim 44 including a plurality of longitudinally spaced bearing assemblies, each assembly including a pair of laterally spaced cylindrical rollers and an endless flexible belt entrained about said roller, said rollers having a spacing and said belt having a length such that a portion of a tubular screw section is rotatably cradled by said belt between said rollers of each bearing assembly.

46. The apparatus of claim 45 including means for supporting the bearing assemblies for at least one of said units at a higher elevation than a corresponding bearing assembly for the other of said units so that one end of at least one trough is higher than the other end thereof, said delivery tubes being located so as to feed liquid nutrient into said one end of said one trough.

47. The apparatus of claim 46 including means subjacent the other ends of said troughs for collecting any liquid nutrient that has flowed through said troughs.

48. Apparatus for growing plants comprising a group of troughs for holding a number of individual plants, means supporting said group of troughs at one growing location in a parallel relation in which said troughs are spaced relatively close together, means supporting said same group of troughs at a second growing location in a parallel relation in which said troughs are spaced farther apart, means supporting said same group of troughs at a third growing location in a parallel relation in which said troughs are spaced still farther apart, and means for simultaneously advancing each of said troughs of said same group in a parallel relation from said one location to said second location and then to said third location, said advancing means progressively increasing the parallel spacing between said troughs as said troughs are advanced as a group from said one location to said second location and progressively increasing still further the parallel spacing between said troughs as said troughs are advanced as a group from said second location to said third location so that the parallel spacing between said troughs existing at said one location is increased to that of said second growing location when said same group of troughs reach said second location and so that the parallel spacing between said troughs when at said second location is increased to that of said third growing location when said same group of troughs reach said third location.

49. Apparatus for growing plants comprising a group of generally parallel troughs for holding a number of individual plants, means for supplying a liquid nutrient at at least first, second and third growing stations, said third growing station being spaced from said first growing station and said second growing station being intermediate said first and third growing stations, means for advancing said same group of troughs from said first growing station to said second growing station and simultaneously increasing the spacing between said troughs of said same group during the advancement thereof from said first growing station to said second growing station, means for advancing said same group of troughs from said second growing station to said third growing station and further increasing the spacing between said troughs of said same group of troughs during the advancement thereof from said second growing station to said third growing station.

50. Apparatus in accordance with claim 49 in which said same group of troughs is stopped at each of said growing stations.

51. Apparatus in accordance with claim 49 in which said first growing station is a loading station and said third growing station is an unloading station.

52. Apparatus in accordance with claim 51 including additional intermediate growing stations, and respective means for advancing said group of troughs between said additional intermediate growing stations and increasing the spacing between said troughs during the advancement thereof between said additional growing stations.

53. Apparatus for growing plants comprising a group of troughs for holding a number of individual plants, means for positioning said troughs in an initially closely spaced parallel relation at a first growing station, a first plurality of feed tubes at said first growing station having a spacing correlated with that of said initially closely spaced troughs when positioned at said first growing station, means for moving said same group of troughs to a second growing station in which the parallel spacing between said troughs is increased, a second plurality of feed tubes at said second growing station having a spacing correlated with the increased parallel spacing of said troughs when positioned at said second growing station, means for moving said same group of troughs to a third growing station in which the parallel spacing between said troughs is further increased, and a third plurality of feed tubes at said third growing station having a spacing correlated with the further increased parallel spacing of said troughs when positioned at said third growing station.

54. Apparatus in accordance with claim 53 in which said first plurality of feed tubes is directly aligned with one end of said troughs at said first growing station, said second plurality of feed tubes is directly aligned with said one ends of said troughs at said second growing station and said second plurality of feed tubes is directly aligned with said one ends of said troughs at said third growing station, and means for interrupting the flow of nutrient into said troughs during movement of said troughs by said moving means.

55. Apparatus in accordance with claim 53 in which said first group of feed tubes is offset with one end of said troughs at said first growing station, respective deflecting means associated with each tube of said first group for deflecting nutrient from a tube of said first group to a trough when positioned at said first growing station, in which said second group of feed tubes is offset with respect to said one ends of said troughs when at said second growing station, additional respective deflecting means associated with each tube of said second group for deflecting nutrient from a tube of said second group to a trough when positioned at said second growing station, in which said third group of feed tubes is offset with respect to said one ends of said troughs when at said third growing station, still more respective deflecting means associated with each tube of said third group for deflecting nutrient from a tube of said third group to a trough positioned at said third growing station, the flow of nutrient into said troughs being continued during movement of said troughs by said moving means.

56. Apparatus in accordance with claim 53 including means for relatively adjusting the elevation of the opposite ends of said troughs at said growing stations to control the depth of nutrient in said troughs.

57. A method of growing plants comprising the steps of arranging said plants in parallel troughs for advancement in one direction perpendiculr to said troughs between first, second and third growing stations, increasing the spacing between said troughs to increase the spacing between said plants as said plants are advanced in said one direction from said first to second station and from said second to third station, delivering a liquid nutrient into one end of each trough, and changing the depth of nutrient in at least one trough by relatively adjusting the elevation of the other end as said trough moves between said first, second and third stations.

58. A method of growing plants comprising the steps of arranging said plants in a plurality of elongated troughs at a first station, spacing said troughs relatively close together in a parallel relation with each other, positioning a first group of delivery tubes at said first station adjacent one end of said troughs having a spacing therebetween corresponding to that of said toughs at said first station for feeding a nutrient to the plants to be grown, allowing said plants to partially mature during a first growing period while said troughs are closely spaced with respect to each other at said first station, advancing said parallel troughs in one direction perpendicular to said troughs to a second station at the end of said first growing period, increasing the spacing between said troughs, positioning a second group of delivery tubes at said second station adjacent said one ends of said troughs having a spacing therebetween corresponding to the increased spacing of said troughs at said second station, advancing said parallel troughs in said one direction to a third station at the end of a second growing period, further increasing the spacing between said troughs, and positioning a third group of delivery tubes at said third station adjacent said one ends of said troughs having a spacing therebetween corresponding to the further increased spacing of said troughs at said third station.

59. The method of claim 58 including the steps of relatively adjusting the ends of said troughs at said stations so that said troughs are more horizontal at said first station than at said second and third stations to cause the depth of nutrient to be greater at said first station than at said second and third stations.

60. A method of growing plants at first, second and third locations, said third location being spaced from said first location and said second location being between said first and third locations, the method comprising the steps of arranging certain of the plants to be grown in a first number of parallel rows at said first location, moving said first number of parallel plant rows from said first growing location to said second growing location and increasing the distance between said rows during the movement thereof while maintaining said rows parallel, and again moving said first number of parallel plants rows from said second growing location to said third growing location and further increasing the distance between said same rows during the movement thereof between said second and third locations.

61. The method of claim 60 including the steps of arranging additional plants to be grown in a second preferred number of parallel rows at said first location after said first number of rows has been moved to said second growing location, and moving said second number of rows from said first growing location to said second growing location as said first number of rows is moved from said second growing location to said third growing location.

* * * * *